" " "(12) United States Patent
Botkus et al.

(10) Patent No.: US 11,739,786 B2
(45) Date of Patent: Aug. 29, 2023

(54) CONNECTION DEVICE FOR RELEASABLY CONNECTING TWO ASSEMBLIES

(71) Applicant: Fidlock GmbH, Hannover (DE)

(72) Inventors: Breido Botkus, Hannover (DE); Joachim Fiedler, Hannover (DE); Björn Bleckat, Hannover (DE)

(73) Assignee: Fidlock GmbH, Hannover (DE)

( * ) Notice: Subject to any disclaimer, the term of this patent is extended or adjusted under 35 U.S.C. 154(b) by 221 days.

(21) Appl. No.: 16/761,638

(22) PCT Filed: Nov. 5, 2018

(86) PCT No.: PCT/EP2018/080101
§ 371 (c)(1),
(2) Date: May 5, 2020

(87) PCT Pub. No.: WO2019/086648
PCT Pub. Date: May 9, 2019

(65) Prior Publication Data
US 2021/0180642 A1 Jun. 17, 2021

(30) Foreign Application Priority Data
Nov. 6, 2017 (DE) .......................... 102017125846.9

(51) Int. Cl.
H01R 13/62 (2006.01)
F16B 47/00 (2006.01)
(Continued)

(52) U.S. Cl.
CPC ............ F16B 47/00 (2013.01); A42B 3/0406 (2013.01); F16B 1/00 (2013.01); H01R 13/62 (2013.01);
(Continued)

(58) Field of Classification Search
CPC .......... F16B 47/00; F16B 1/00; A42B 3/0406; H01R 13/62; H01R 13/6205; H01R 33/18;
(Continued)

(56) References Cited

U.S. PATENT DOCUMENTS 4,058,335 A 11/1977 Abe
4,112,941 A * 9/1978 Larimore ............... A61B 5/274
439/153
(Continued)

FOREIGN PATENT DOCUMENTS

CN 101015916 A 8/2007
CN 200959266 Y 10/2007
(Continued)

Primary Examiner — Thanh Tam T Le
(74) Attorney, Agent, or Firm — THE WEBB LAW FIRM

(57) ABSTRACT

A connecting apparatus detachably connects two assemblies. The connecting apparatus includes a fastener module securable to a first of the assemblies and including a negative-pressure element, and an attachment component of a second of the assemblies. The negative-pressure element is connectable in an attachment direction to the attachment component for connecting the assemblies with one another, wherein, in a connected position, the negative-pressure element interacts with the attachment component such that, in the event of a load acting in between the fastener module and the attachment component opposite to the attachment direction, the negative-pressure element and the attachment component are held against one another by a negative pressure acting between the negative-pressure element and the attachment component. The fastener module includes an adjustment element which is adjustable relative to the negative-pressure element and which is movable relative to the negative-pressure element.

4 Claims, 28 Drawing Sheets

(51) Int. Cl.
    *A42B 3/04*     (2006.01)
    *F16B 1/00*     (2006.01)
    *B60R 11/02*     (2006.01)
    *B60R 11/00*     (2006.01)
    *H01R 33/18*     (2006.01)
    *H04N 23/54*     (2023.01)

(52) U.S. Cl.
    CPC .......... *H01R 13/6205* (2013.01); *B60R 11/02* (2013.01); *B60R 2011/0005* (2013.01); *B60R 2011/0026* (2013.01); *B60R 2011/0056* (2013.01); *F16B 2001/0035* (2013.01); *H01R 33/18* (2013.01); *H04N 23/54* (2023.01)

(58) Field of Classification Search
    CPC ............. B60R 11/02; B60R 2011/0005; B60R 2011/0026; B60R 2011/0056
    See application file for complete search history.

(56) References Cited

U.S. PATENT DOCUMENTS

| | | | | |
|---|---|---|---|---|
| 4,402,560 | A * | 9/1983 | Swainbank | A61N 1/14 439/86 |
| 4,662,695 | A * | 5/1987 | Gordon | H01R 13/6485 361/220 |
| 4,755,144 | A * | 7/1988 | Gordon | H01R 13/6485 361/220 |
| 5,076,527 | A | 12/1991 | Yung-Huei | |
| 5,192,043 | A | 3/1993 | Fa | |
| 5,641,105 | A | 6/1997 | Goto | |
| 5,829,987 | A * | 11/1998 | Fritsch | H01R 13/7037 200/51.09 |
| 6,910,911 | B2 * | 6/2005 | Mellott | H01R 13/2421 439/341 |
| 7,351,066 | B2 * | 4/2008 | DiFonzo | H01R 13/6205 439/39 |
| 7,775,801 | B2 * | 8/2010 | Shift | H01R 13/6205 439/700 |
| 7,798,831 | B2 * | 9/2010 | Sanford | H01R 43/24 439/38 |
| 8,430,434 | B2 * | 4/2013 | Fiedler | A44B 11/2592 292/251.5 |
| 8,739,371 | B2 * | 6/2014 | Fiedler | A45C 13/1069 24/303 |
| 8,925,881 | B2 | 1/2015 | Diatzikis et al. | |
| 9,482,255 | B2 | 11/2016 | Changsrivong et al. | |
| 9,521,919 | B1 | 12/2016 | Reyes | |
| 9,848,071 | B2 * | 12/2017 | Thiers | H01R 31/06 |
| 10,085,080 | B2 * | 9/2018 | Bruss | H01R 12/53 |
| 10,177,491 | B2 * | 1/2019 | Davies | H01R 13/6205 |
| 10,297,950 | B2 * | 5/2019 | Wei | A41D 13/0051 |
| 10,541,484 | B2 * | 1/2020 | Hsu | H01R 13/2421 |
| 2004/0178307 | A1 | 9/2004 | Sim | |
| 2007/0187965 | A1 | 8/2007 | Schaaf et al. | |
| 2013/0313388 | A1 | 11/2013 | Diatzikis et al. | |
| 2013/0323388 | A1 | 12/2013 | Talsma et al. | |
| 2014/0346295 | A1 | 11/2014 | Song | |
| 2016/0376065 | A1 | 12/2016 | Zimmerman | |
| 2017/0085029 | A1 | 3/2017 | Zhang et al. | |

FOREIGN PATENT DOCUMENTS

| | | |
|---|---|---|
| CN | 201177001 Y | 1/2009 |
| CN | 101504029 A | 8/2009 |
| CN | 203604414 U | 5/2014 |
| CN | 105266268 A | 1/2016 |
| DE | 2064615 | 12/1971 |
| DE | 202009010961 U1 | 1/2010 |
| DE | 202014101051 U1 | 8/2014 |
| EP | 0689966 B1 | 11/1998 |
| EP | 2602494 A1 | 6/2013 |
| EP | 3141355 A1 | 3/2017 |
| JP | S4938865 U | 4/1974 |
| JP | S5196176 U | 8/1976 |
| JP | S59177819 U | 11/1984 |
| JP | 2000104724 A | 4/2000 |
| JP | 200768828 A | 3/2007 |
| JP | 2014173709 A | 9/2014 |
| KR | 2020100009777 U | 10/2010 |
| WO | 03012303 A1 | 2/2003 |

\* cited by examiner

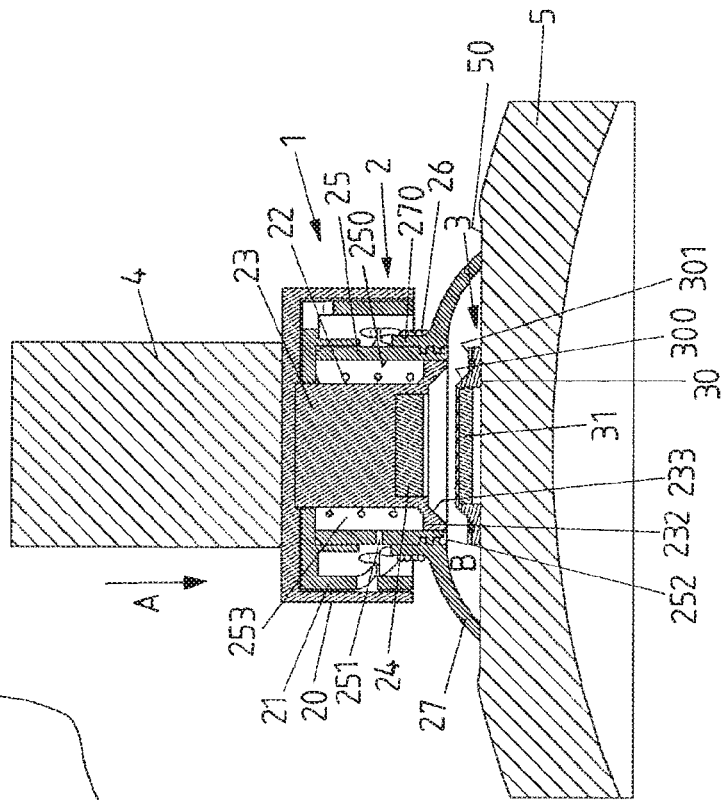
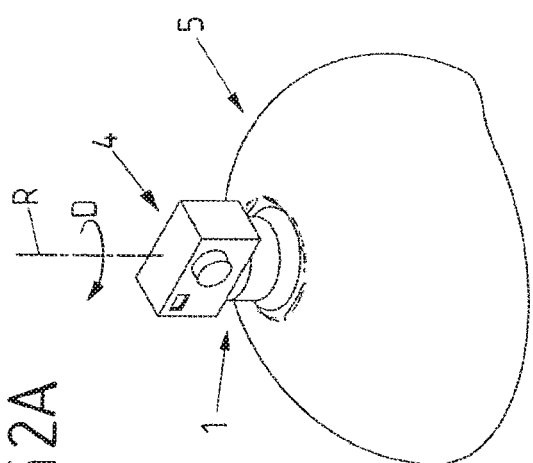
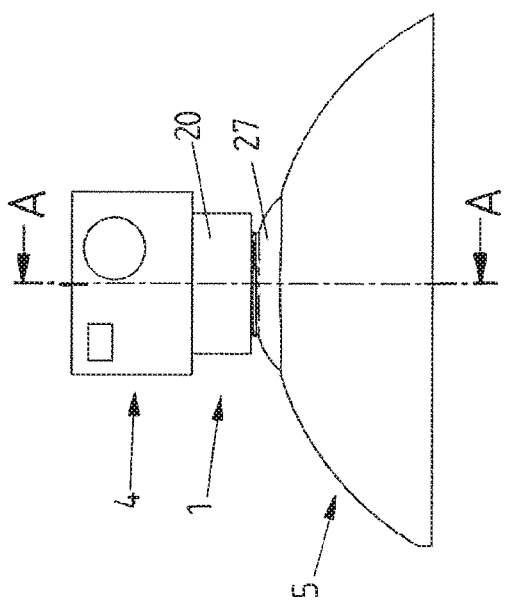

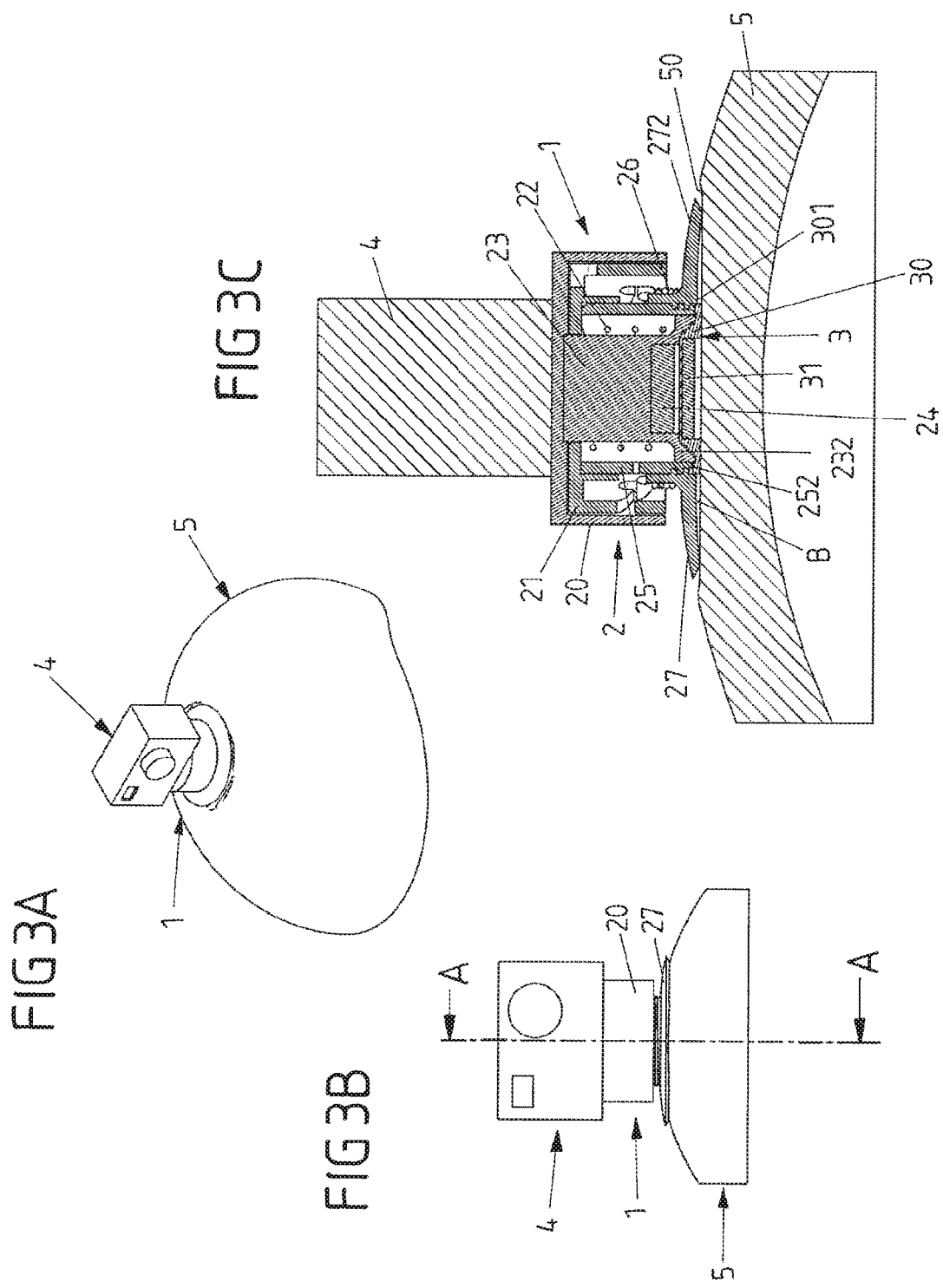

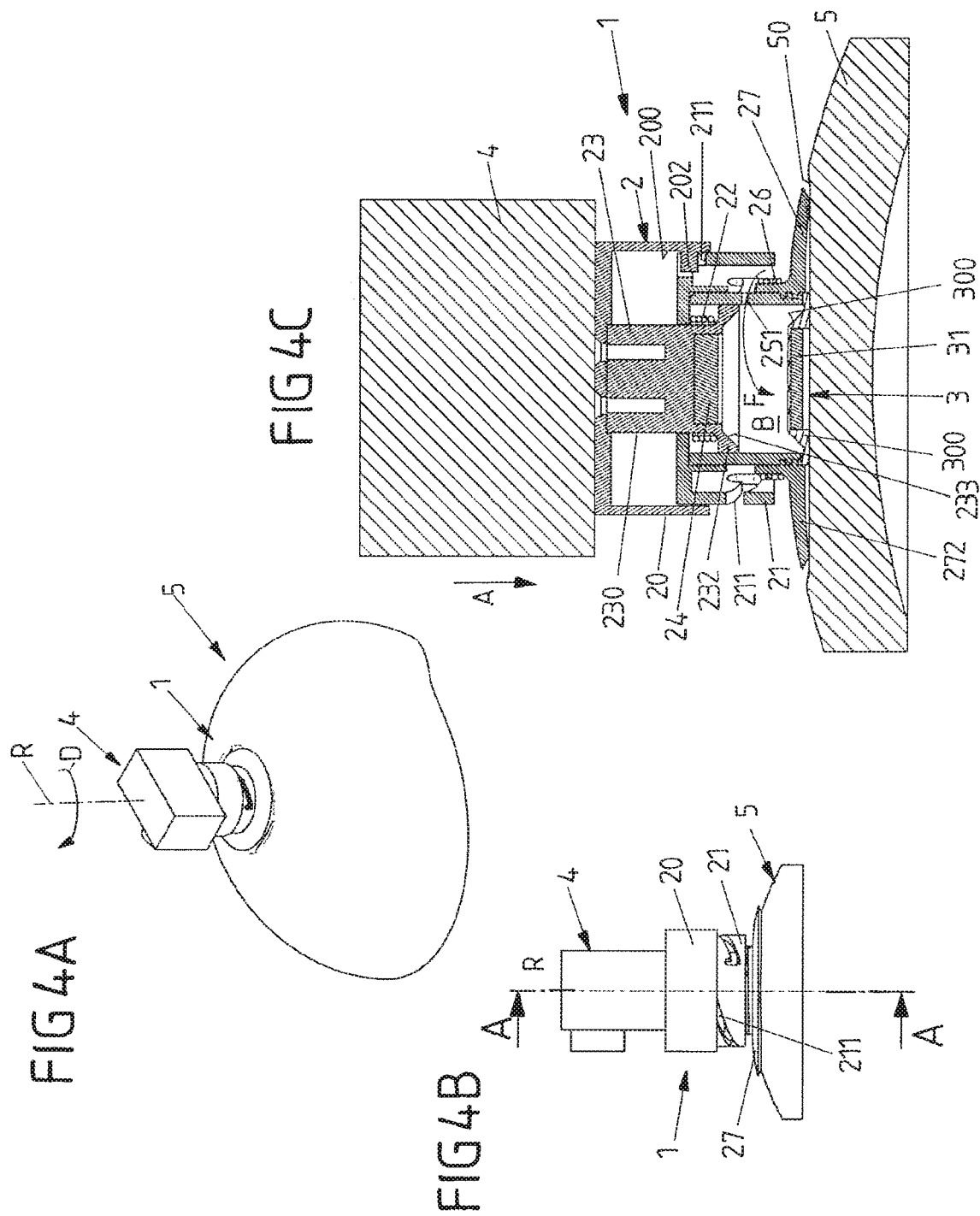

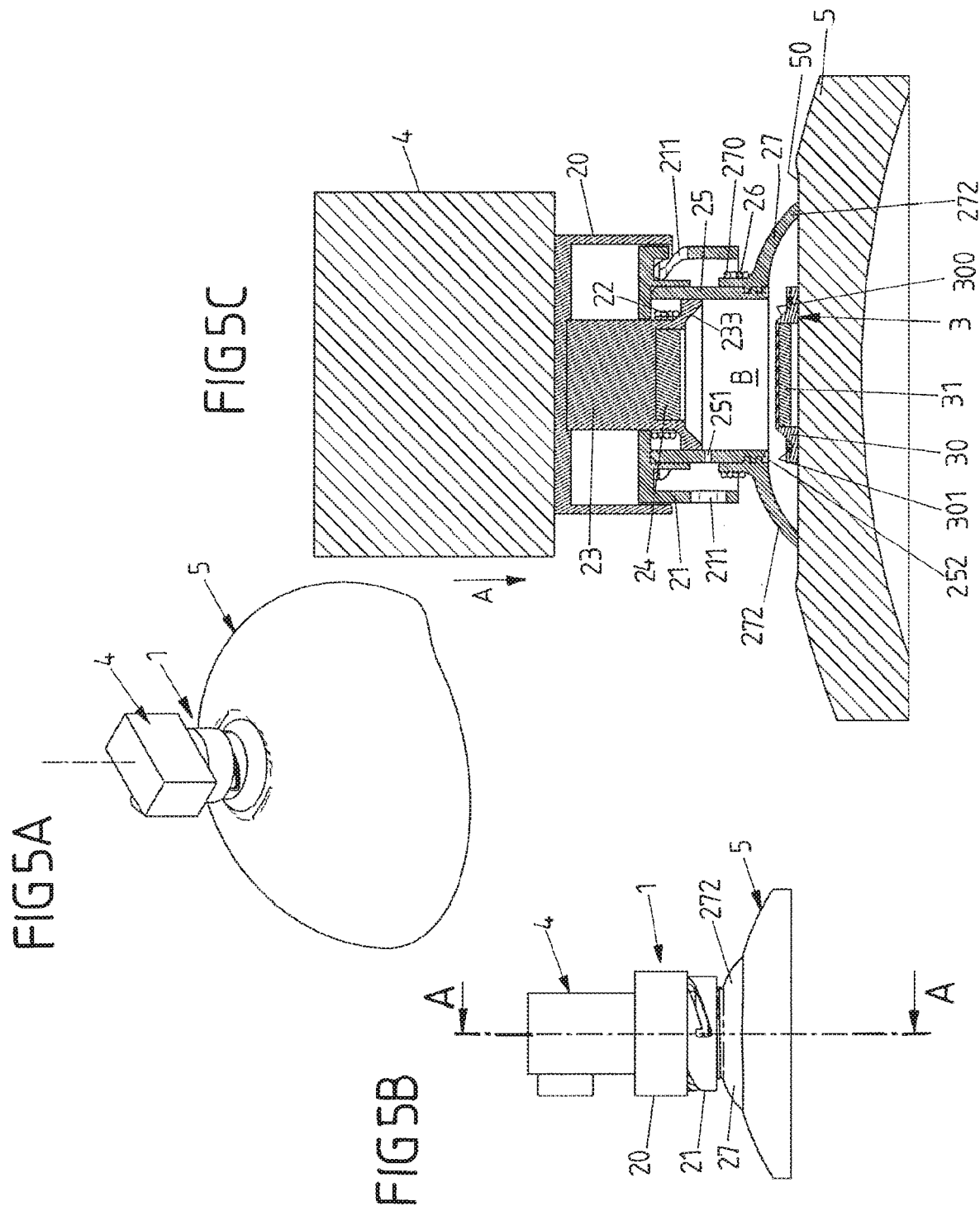

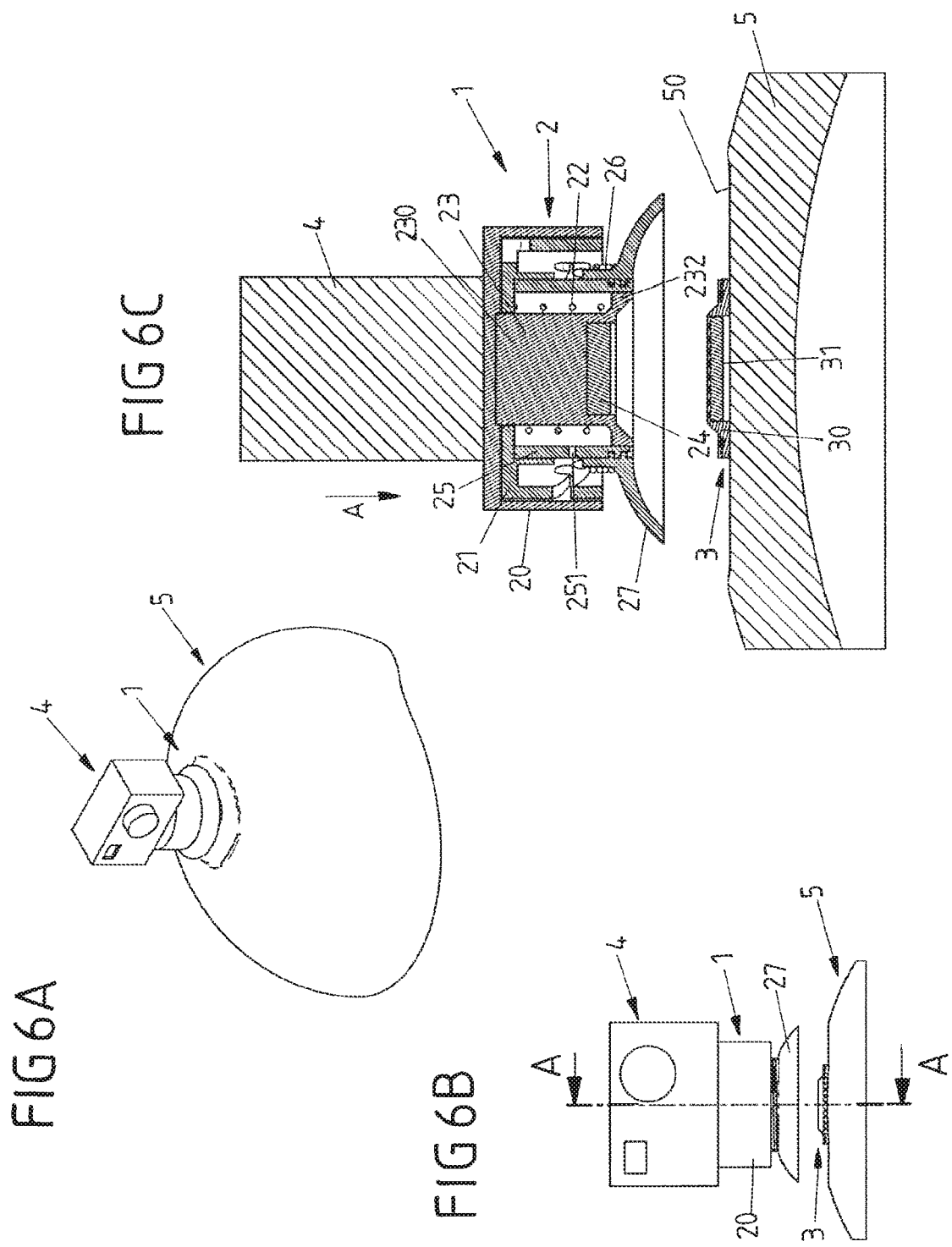

(A-A)

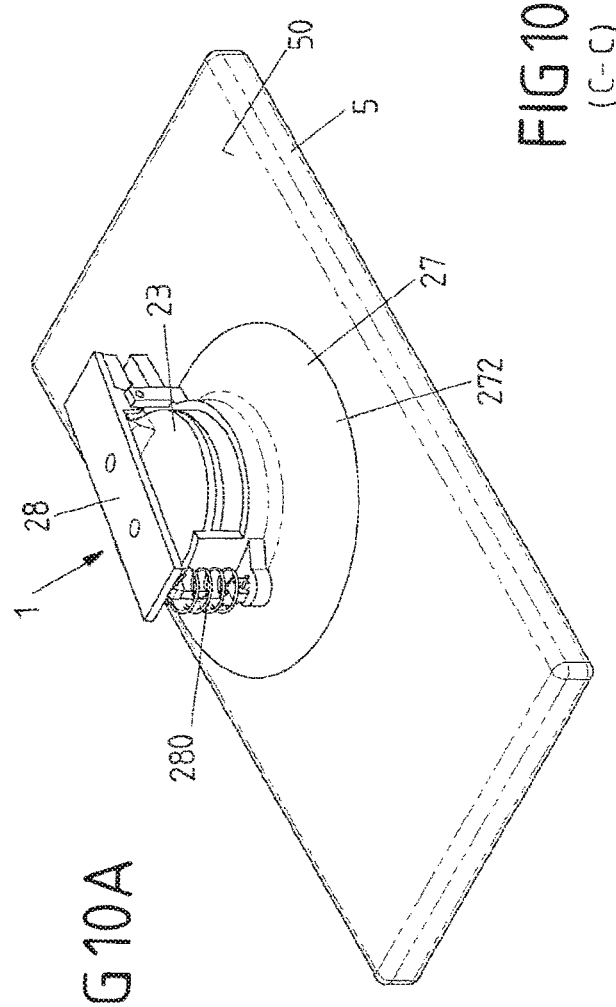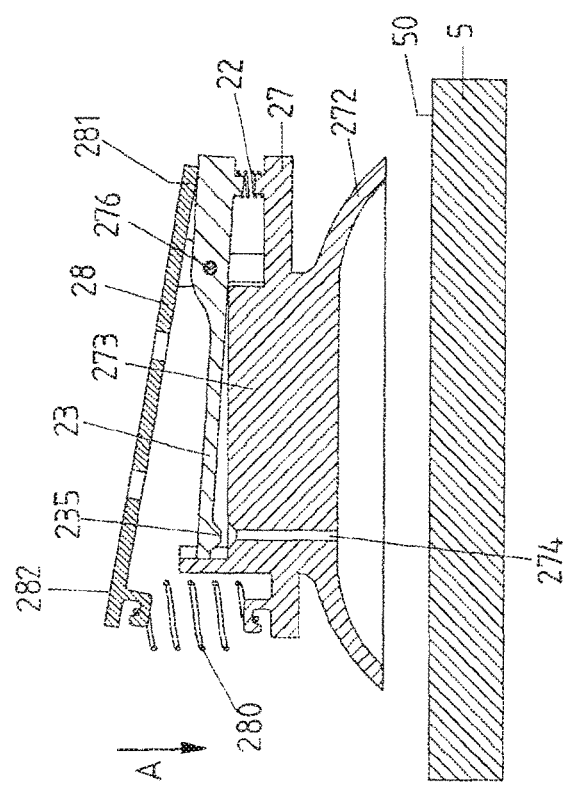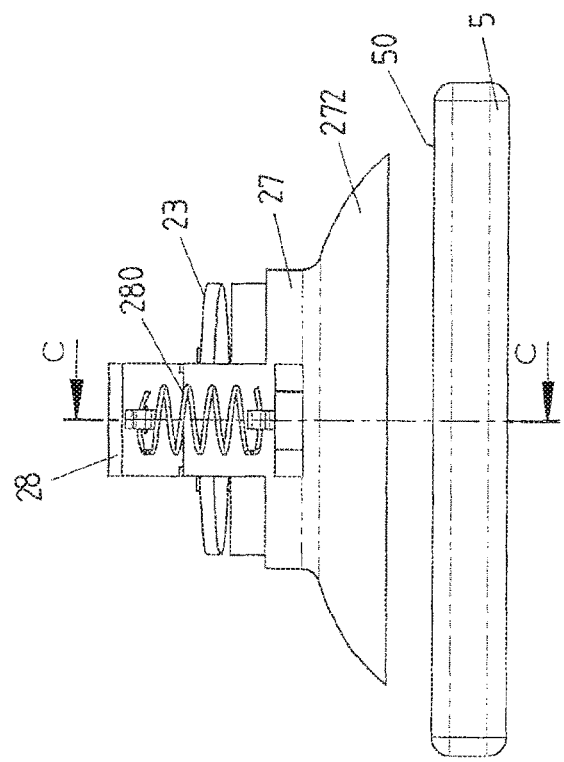

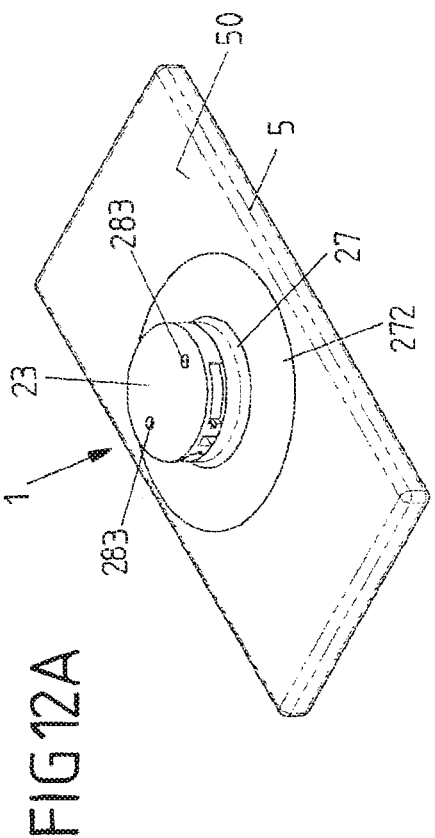
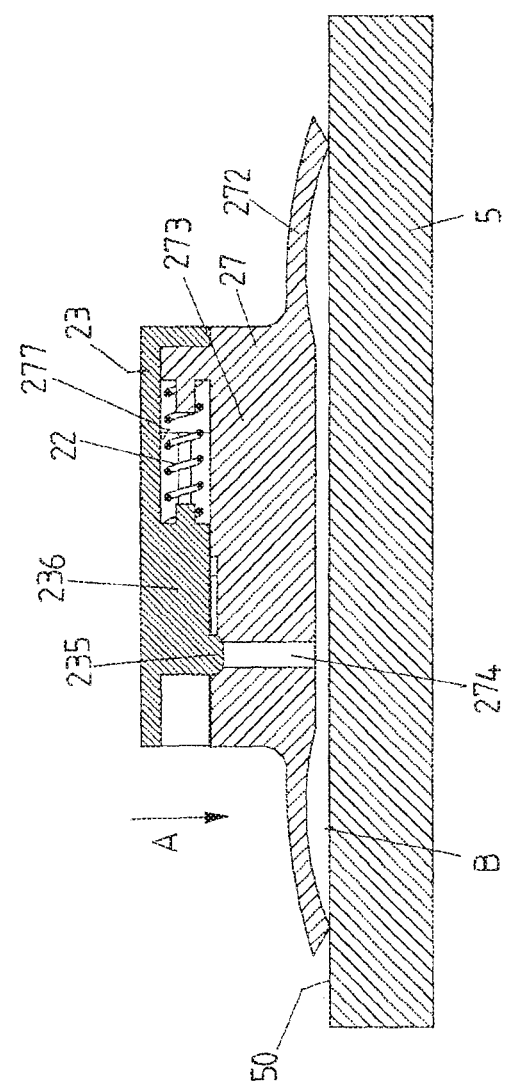
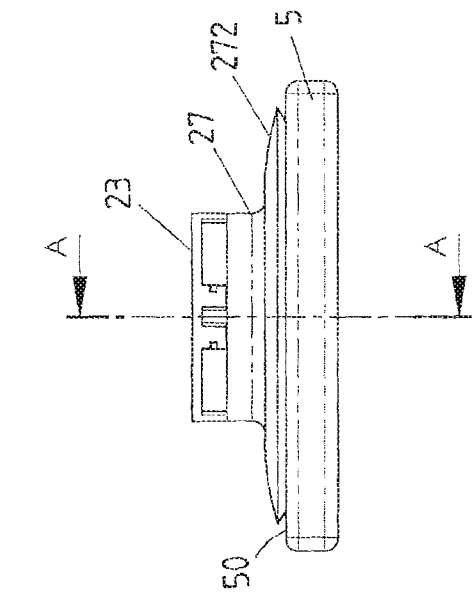

(B-B)

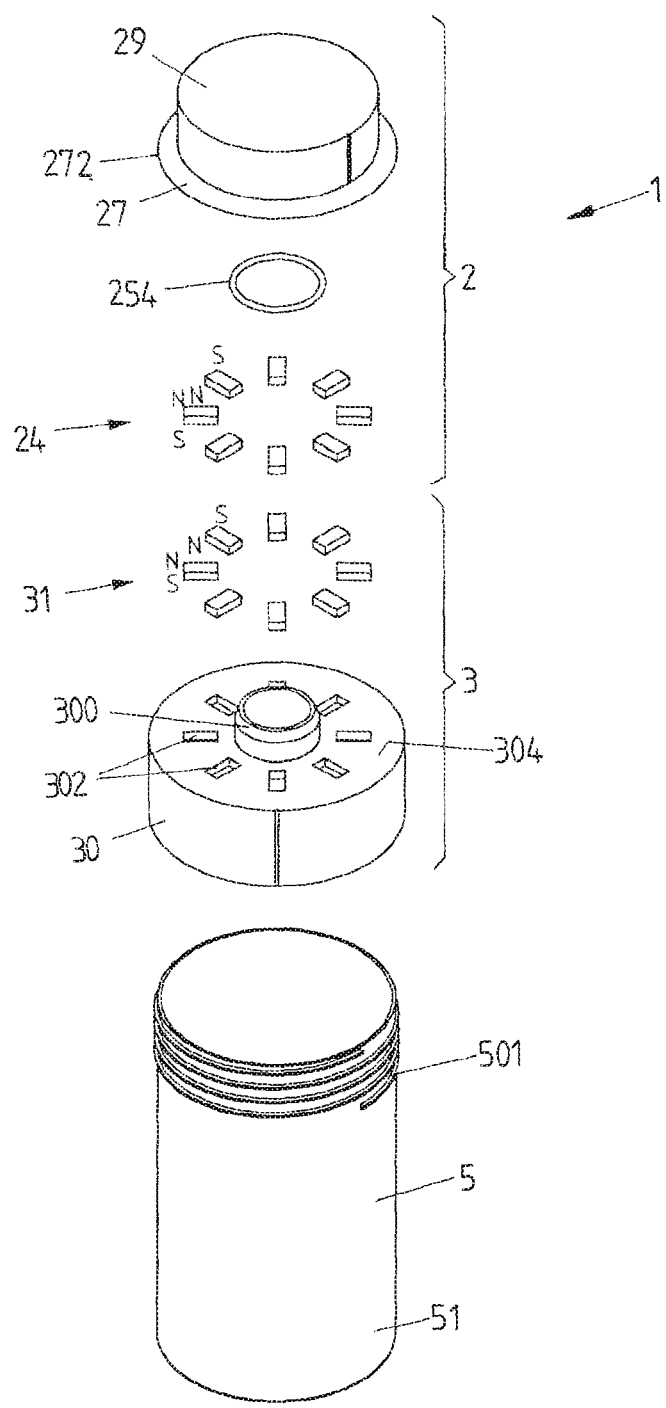

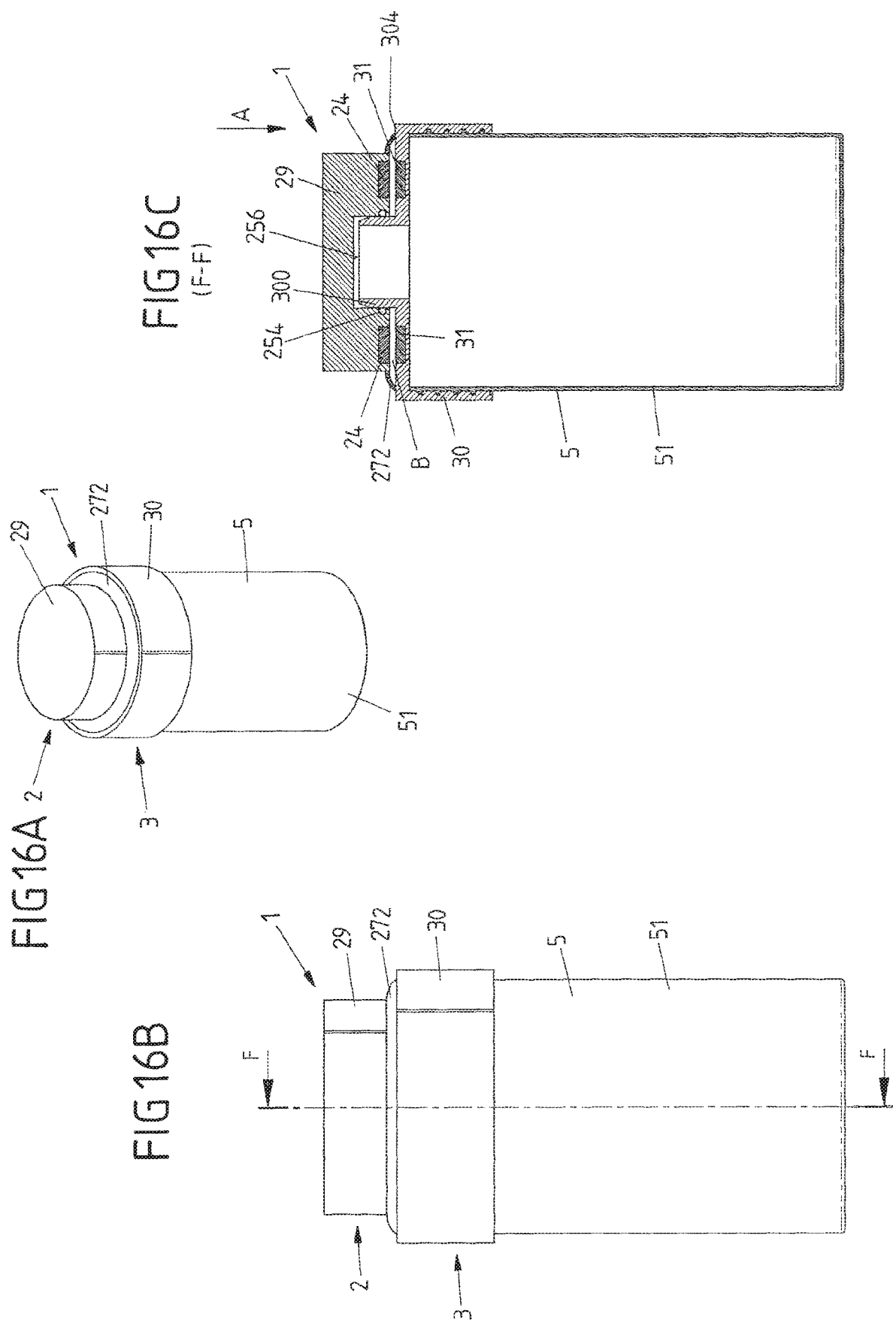

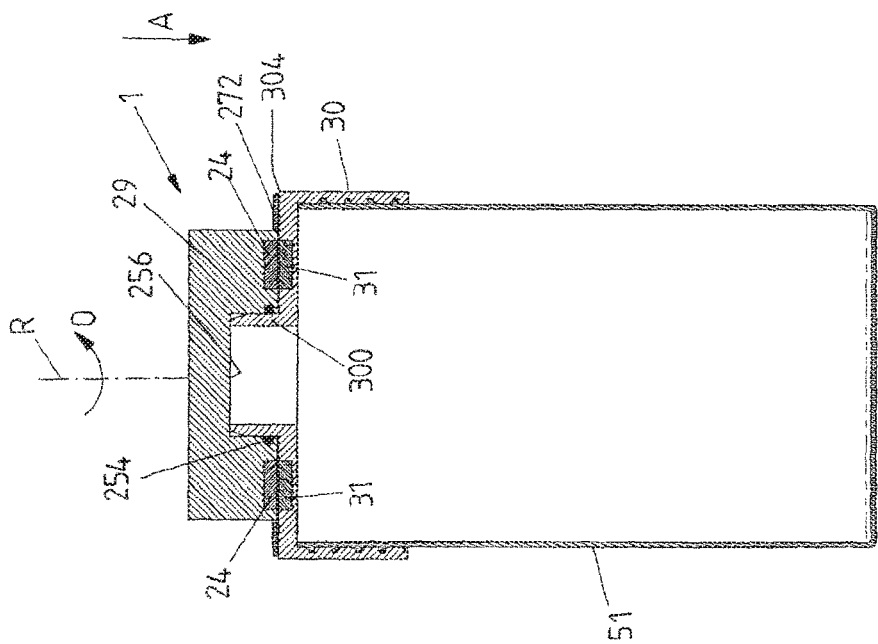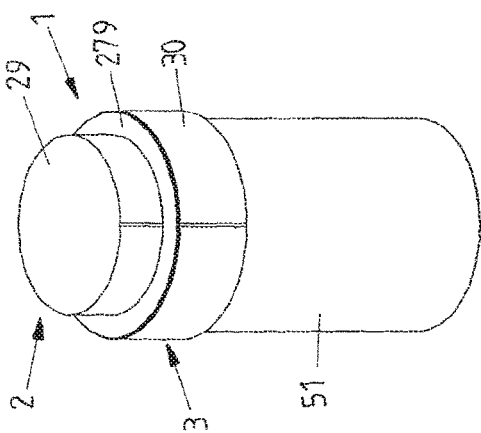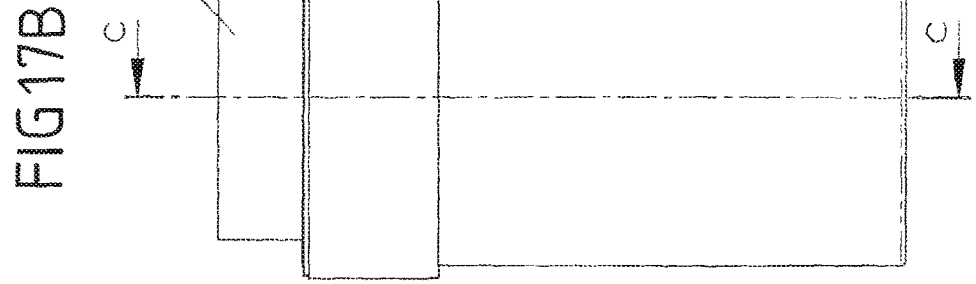

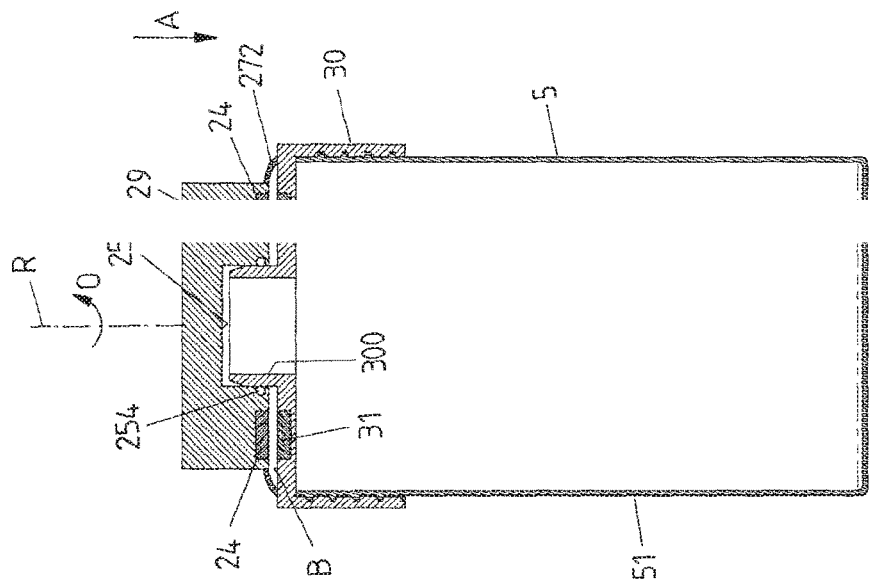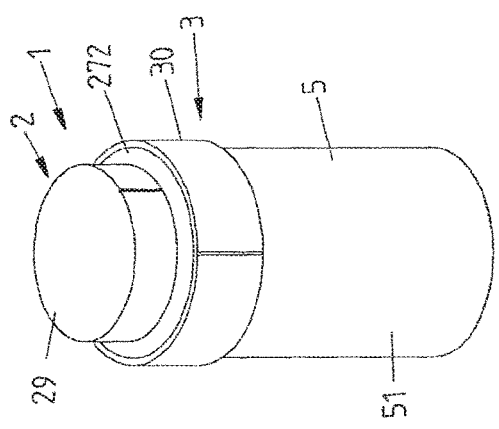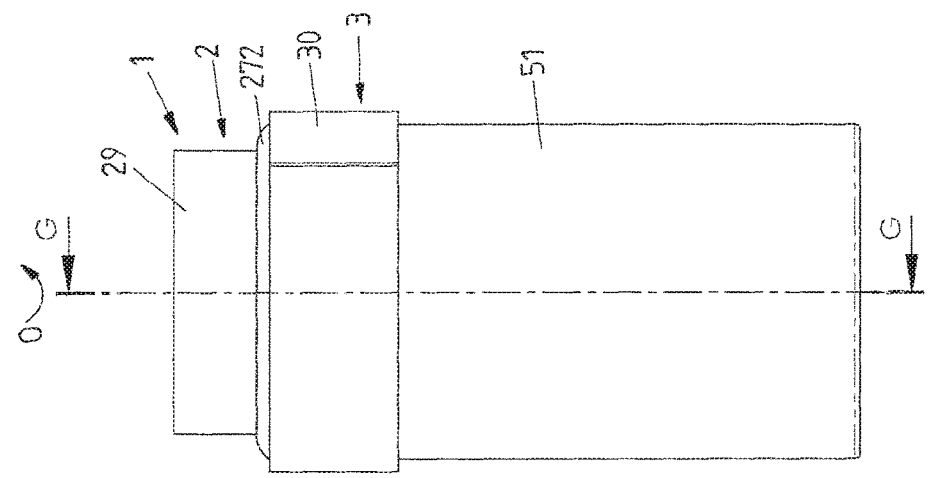

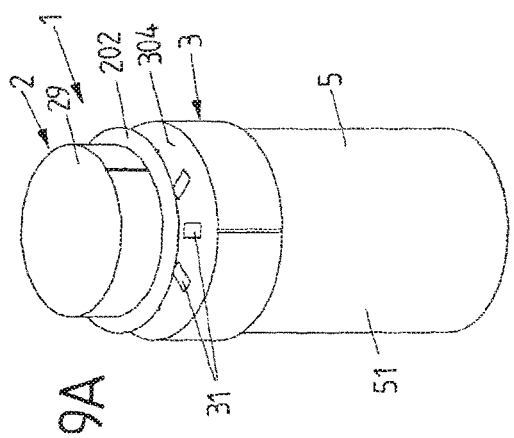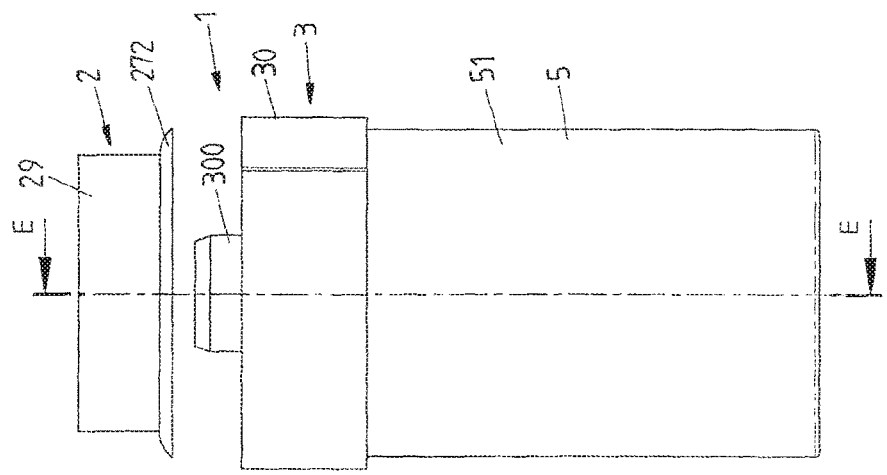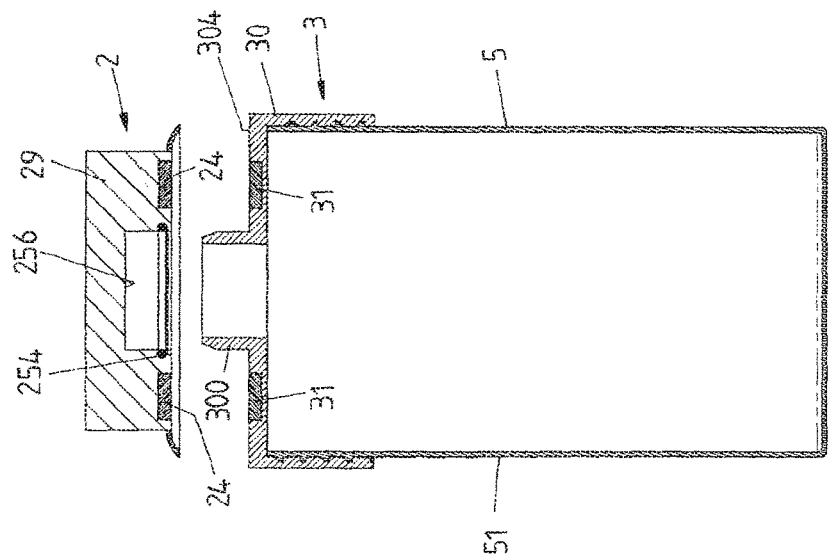

(B-B)

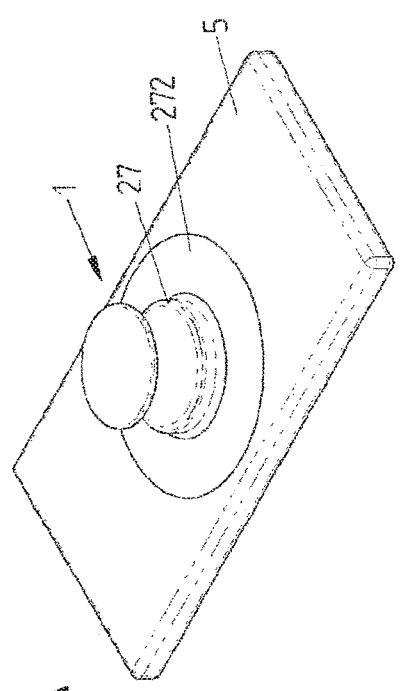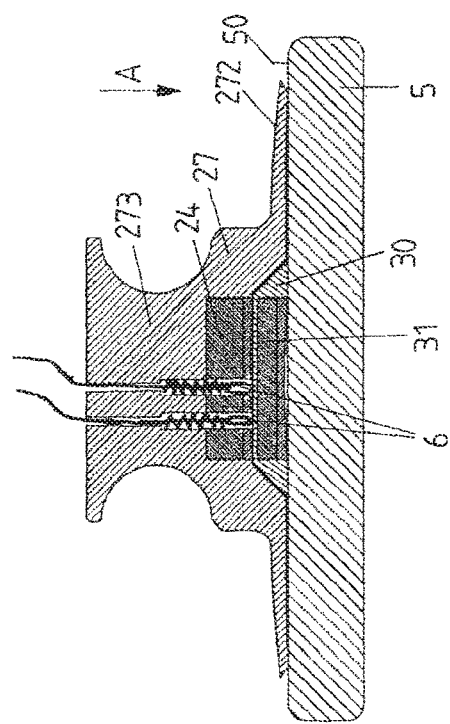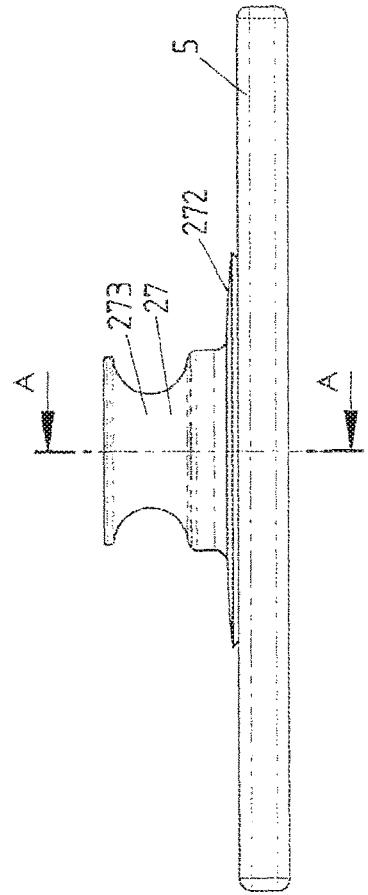

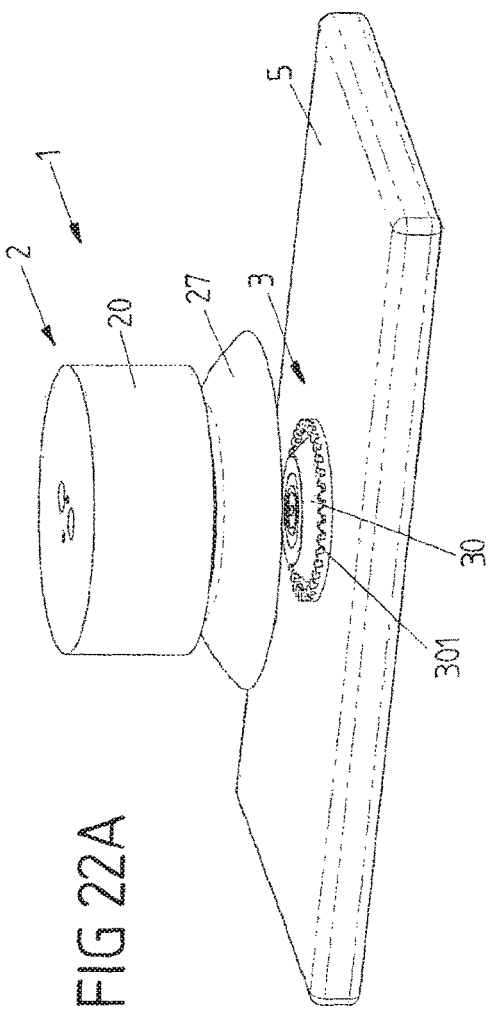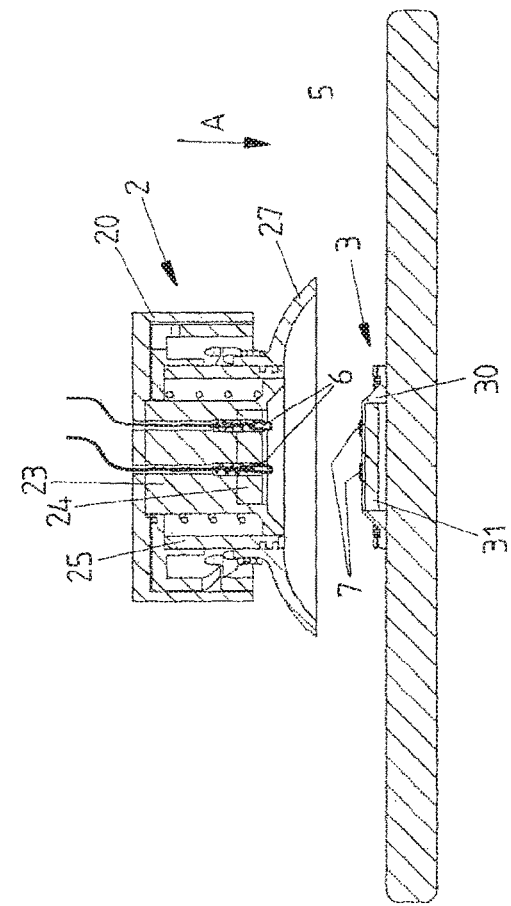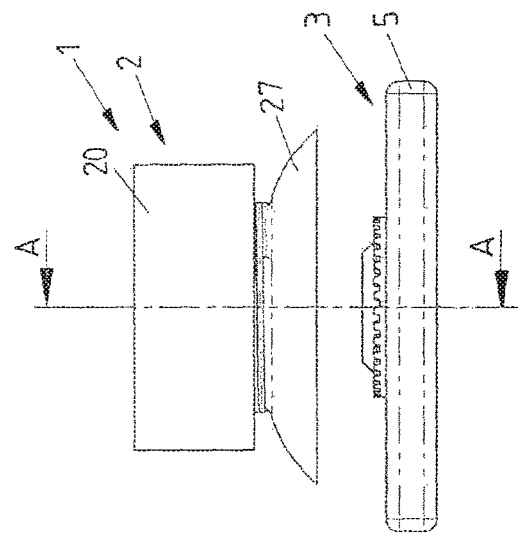

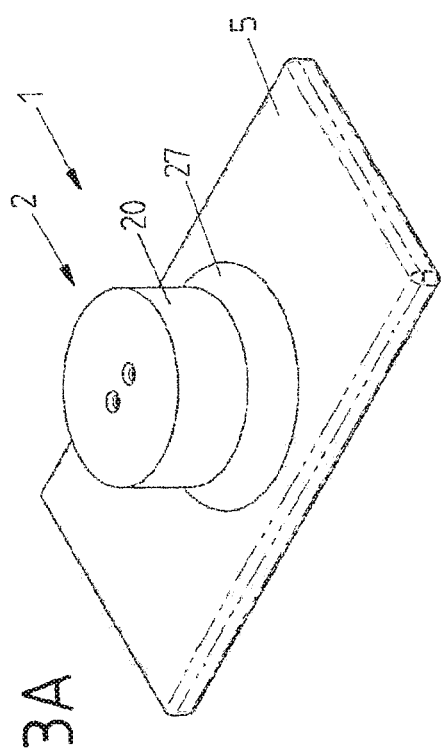
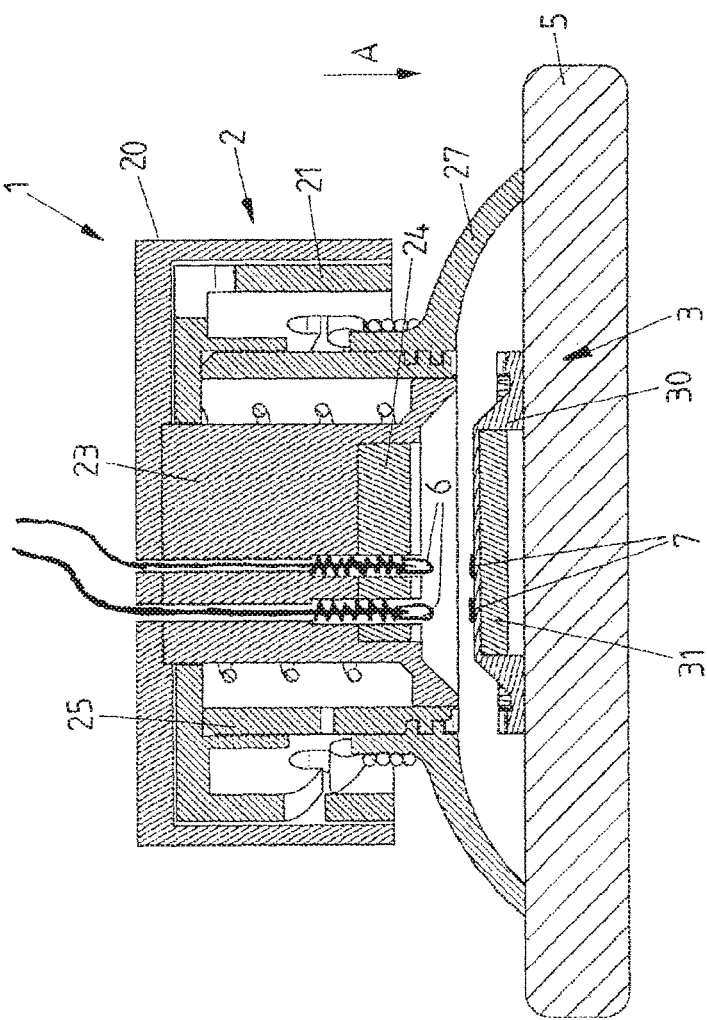
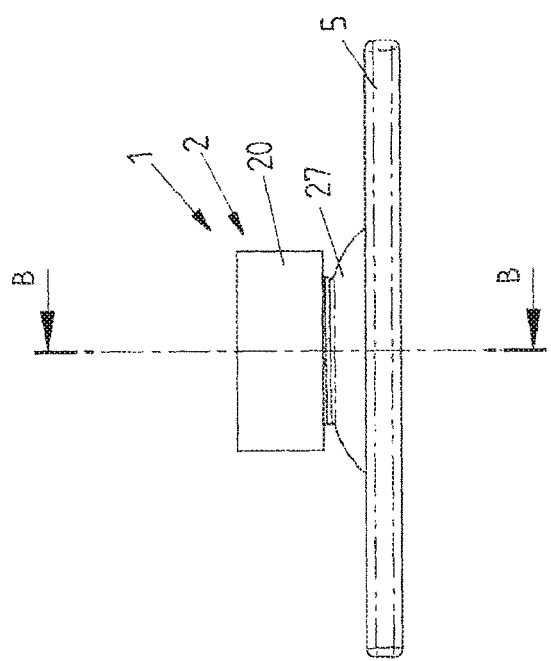
FIG 23A
FIG 23B
FIG 23C (B-B)

(E-E)

CONNECTION DEVICE FOR RELEASABLY CONNECTING TWO ASSEMBLIES

CROSS-REFERENCE TO RELATED APPLICATIONS

This application is the United States national phase of International Application No. PCT/EP2018/080101 filed Nov. 5, 2018, and claims priority to German Patent Application No. 10 2017 125 846.9 filed Nov. 6, 2017, the disclosures of which are hereby incorporated by reference in their entirety.

BACKGROUND OF THE INVENTION

Field of the Invention

The invention relates to a connecting apparatus for detachably connecting two assemblies, to an electronic device and a helmet.

Description of Related Art

A connecting apparatus of said type has a fastener module, which fastener module is securable to a first of the assemblies and has a negative-pressure element, which negative-pressure element is connectable in an attachment direction to an attachment component of the other, second of the assemblies for the purposes of connecting the assemblies and, in a connected position, interacts with the attachment component such that, in the event of loading of the fastener module and of the attachment component relative to one another counter to the attachment direction, the negative-pressure element and the attachment component are held against one another owing to an action of negative pressure between the negative-pressure element and the attachment component.

In the present case, a connecting apparatus is intended to be able to serve in particular for securing an electronic device to an associated assembly. Accordingly, the connecting apparatus may for example permit the securing of a camera to a helmet (for example a ski helmet or a bicycle helmet) or the securing of a mobile telephone or of some other electronic device in a vehicle, for example to the windshield or to the dashboard of a vehicle.

If a camera is secured to a helmet, for example to a ski helmet or to a bicycle helmet, or a mobile telephone is secured to a dashboard of a vehicle or to the steering wheel of a vehicle, then impulse-like shock forces may act during use, which forces must be accommodated and dissipated and in particular should not lead to a release of the camera or of the mobile telephone. A connecting apparatus for securing an electronic device, for example a camera or a mobile telephone, should therefore be capable in particular of accommodating briefly acting, impulse-like shock forces.

In order to secure very different assemblies to one another, for example also in order to secure an electronic device in the form of a mobile telephone or navigation device in a vehicle, connecting apparatuses are known which provide a holding action by means of negative pressure. For example, US 2013/0323388 A1 has disclosed a connecting apparatus which uses a negative-pressure element in the form of a suction cup in order to fix a mobile telephone to the windshield of a vehicle. For this purpose, the suction cup is attached to the windshield, wherein, on the suction cup, there is arranged a magnet element which can interact with a magnetically acting element on the windshield in order to improve the hold on the windshield.

In the case of a connecting apparatus, known from U.S. Pat. No. 5,192,043, for securing an alarm apparatus to a metal surface, a magnetic rubber surface is attached to a metal surface, wherein, during the attachment, a vacuum is generated such that the alarm apparatus is held on the metal surface by magnetic action between the rubber surface and the metal surface and by negative-pressure forces.

A connecting apparatus known from EP 0 689 966 B1 has a magnetic contact plate on which a suction cup is arranged. By means of the connecting apparatus, a ski carrier can be secured to a vehicle roof of a vehicle.

Such connecting apparatuses should firstly be easy to close in order to produce a connection between the associated assemblies. Furthermore, however, it is also desirable for such connecting apparatuses to be easy to open in order, in particular, to prevent an abrupt breakaway whilst overcoming a negative pressure and possibly additionally a magnetic connection.

SUMMARY OF THE INVENTION

It is an object of the present invention to provide a connecting apparatus which is easy to use, in particular easy to close, but also easy to open again, with an advantageous connection of the associated assemblies even in the event of shock loading.

Said object is achieved by means of a subject matter having features as described herein.

Accordingly, the fastener module has an adjustment element which is adjustable relative to the negative-pressure element and which is movable relative to the negative-pressure element for the purposes of releasing the negative-pressure element from the attachment component and to which the first of the assemblies is connectable such that a relative movement between the first of the assemblies and the second of the assemblies effects a movement of the adjustment element.

The connecting apparatus thus comprises an adjustment element which is arranged on the fastener module and which is adjustable relative to the negative-pressure element. The adjustment element permits a detachment of the negative-pressure element from the attachment component by virtue of the first assembly associated with the fastener module being able to be operatively connected to the adjustment element such that a movement of the first assembly relative to the second assembly leads to a movement of the adjustment element.

The first assembly may be realized for example by an electronic device such as for example a camera or a mobile telephone. The first assembly may in this case be connected directly or indirectly to the adjustment element such that, in order to detach the connecting apparatus, a user can act on the first assembly, for example on the camera or the mobile telephone, in order to thereby also move the adjustment element and thus detach the fastener module from the associated attachment component.

In the case of the connecting apparatus, a connection between the assemblies that are to be secured to one another is produced by virtue of the fastener module, which is connected to a first of the assemblies, being attached to an attachment component of the other, second of the assemblies (or conversely the attachment component being attached to the fastener module). During the attachment, a sealed space is formed between the negative-pressure element and the attachment component, such that the assemblies are held against one another owing to a negative-pressure action. Such a connection can in particular be subjected to shock loading, such that shock forces can be accommodated and dissipated via the connecting apparatus.

By means of the connecting apparatus, it is for example possible for a camera to be secured to a helmet or for a mobile telephone to be secured in a vehicle, for example to a windshield or to a dashboard.

In the connected position of the connecting apparatus, the negative-pressure element and the attachment component may for example bear areally against one another, such that there is effectively no space between the negative-pressure element and the attachment component. However, in the event of loading of the assemblies relative to one another, a force may act on the fastener module relative to the attachment component, which force acts in the direction of an enlargement or creation of a space formed between the negative-pressure element and the attachment component, which space causes a negative pressure between the negative-pressure element and the attachment component and thus generates holding forces which hold the negative-pressure element on the attachment component and which tend to become greater the more intensely the fastener module is loaded relative to the attachment component. The fastener module is thus held against the attachment component owing to negative-pressure action when the fastener module has been attached to the attachment component.

Here, the fastener module may have a flow opening which, as a result of movement of the adjustment element relative to the negative-pressure element, can be opened up for the purposes of an inflow of air into a space that is present between the negative-pressure element and the attachment component. For example, the adjustment element, in the connected position of the connecting apparatus, may assume a first position relative to the negative-pressure element in which the flow opening (viewed from the direction of a space between the negative-pressure element and the attachment component) is closed off such that an inflow of air into the space is prevented. The adjustment element can be moved out of this first position into a second position in order to open up the flow opening and permit an inflow of air into a space formed between the negative-pressure element and the attachment component. A negative-pressure action between the negative-pressure element and the attachment component thus no longer exists owing to the inflow through the flow opening, such that the fastener module can be removed, without negative-pressure action, from the attachment component.

In one advantageous embodiment, the adjustment element is spring-preloaded in the direction of its first position. The adjustment element thus automatically, when not otherwise actuated, assumes its first position and thus closes the flow opening, in particular in the connected position of the connecting apparatus, such that a negative-pressure action can be generated between the negative-pressure element and the attachment component.

For this purpose, the fastener module preferably has an elastic preloading element which serves for preloading the adjustment element in the direction of the first position. During adjustment, the adjustment element is moved counter to the preloading action of the preloading element, such that, after the actuation is ended, the adjustment element is automatically reset into its first position.

The negative-pressure element on the fastener module and the attachment component on the other, second assembly may be designed very differently, and interact in very different ways.

In a first embodiment, the negative-pressure element may for example be of cylindrical form and provided for insertion into an attachment component formed as a cylindrical receptacle. Here, the negative-pressure element and the attachment component may be formed as rigid, non-elastic components, and are coordinated with one another in terms of their shaping such that the negative-pressure element can for example be introduced with an accurate fit into an opening of the attachment component. If, during the attachment of the negative-pressure element to the attachment component, air escapes from a space formed between the negative-pressure element and the attachment component, for example through a valve provided for this purpose, then there is formed between the negative-pressure element and the attachment component a vacuum and thus, if the negative-pressure element is loaded in the direction of a detachment from the attachment component, a negative pressure, such that the negative-pressure element is held against the attachment component in this way.

The negative-pressure element and the opening, provided for the negative-pressure element, of the attachment component may in this case have a circular cross section. Any desired cross-sectional shapes, for example also a polygonal cross section, for example a polygon, or even an entirely arbitrary other shape, are however basically conceivable and possible. The expression "cylinder" is thus to be understood in this context as a general cylinder with any desired cross-sectional shape.

In the variant just described, the negative-pressure element and the attachment component may each be formed as rigid components that are provided for being inserted one inside the other. Here, it is however also conceivable and possible for one or more elastic seals to be provided on one or on both components for the purposes of sealing off the components against one another.

In this first embodiment, it is for example possible for a flow opening in the form of a valve to be opened up by adjustment of the adjustment element, such that, in this way, the negative pressure between the negative-pressure element and the attachment component can be eliminated.

In another, second embodiment, the negative-pressure element is formed by a cup element, which is elastic at least in certain portions, and the attachment component is formed by an attachment face which is formed on the second assembly and with which the negative-pressure element can be placed in contact for the purposes of connecting the assemblies in order to provide a negative-pressure action. In this case, the negative-pressure element thus realizes a component in the manner of an elastic suction cup, which can be arranged on a surface of the associated, second assembly in order, under elastic deformation, to form a vacuum between the negative-pressure element and the surface and thereby provide holding forces for holding the assemblies against one another.

In this case, the adjustment element can for example be moved for the purposes of opening a flow opening in the form of a valve, in order to thereby permit an air flow into a space between the negative-pressure element and the attachment component. It is however alternatively also conceivable and possible that, as a result of movement of the adjustment element, the negative-pressure element in the form of the cup element is lifted off from the surface, for example is pulled off in a direction perpendicular to the surface, wherein, for example, force-diverting elements can effect a separating force between the fastener module and the attachment component.

In one embodiment, the adjustment element is guided on the negative-pressure element or on an element fixedly connected to the negative-pressure element. Here, the movement of the adjustment element relative to the negative-pressure element may take place along a guide track which is rectilinear or else curved, for example curved in a circular-arc-shaped manner. By means of the guided movement, it is for example possible for a flow opening to be opened up in order to thereby permit an air flow between the negative-pressure element and the attachment component and thus eliminate a negative-pressure action between the negative-pressure element and the attachment component.

The adjustment element may basically be rotatable, displaceable and/or tiltable relative to the negative-pressure element. For example, the adjustment element may, as a flap element or as a lever element, be pivotably mounted on the negative-pressure element or on a component connected to the negative-pressure element, and may be pivoted relative to the negative-pressure element in order to open up a flow opening and thus eliminate a negative-pressure action between the negative-pressure element and the attachment component.

The first assembly is directly or indirectly connected to the adjustment element, such that a movement at the first assembly also leads to a movement of the adjustment element in particular for the purposes of detaching the fastener module from the attachment component. If the first assembly is arranged directly on the adjustment element, then the first assembly is fixedly connected to the adjustment element, for example by means of a screw connection. If the first assembly is directly connected to the adjustment element, then the first assembly may for example be arranged on an actuation element, which actuation element is operatively connected to the adjustment element such that the adjustment element is also moved in the event of an actuation of the actuation element. The actuation element may for example be in the form of a lever which, during a pivoting movement, acts on and moves the adjustment element, such that, for example, a flow opening is opened up for the purposes of eliminating a negative-pressure action between the negative-pressure element and the attachment component.

In one specific embodiment, the fastener module has a cylinder part, which is fixedly connected to the negative-pressure element and guides the adjustment element. For example, the adjustment element may for example be situated with a head portion (with a circular cross section) in a cylindrical cavity (with a circular cross section) of the cylinder part and be adjustable slidingly along an inner face, which surrounds the cylindrical cavity, of the cylinder part. The adjustment element thus acts in the manner of a piston in the cylindrical cavity of the cylinder part, such that, by adjustment of the adjustment element in the cylindrical cavity of the cylinder part, the volume of the space between the negative-pressure element and the attachment component can be increased. During adjustment, the adjustment element is thus moved within the cylinder part and thus slides within the cavity of the cylinder part.

In one embodiment, the adjustment element is guided relative to the cylinder part on a guide track which extends along a portion of a helix. The guide track may for example be formed on a guide part which has a lateral face extending circumferentially around the cylinder part and which is thus arranged radially outside the cylinder part. The guide track may be formed in the manner of a slot into the lateral face, wherein, for example, a guide element of a casing part connected to the adjustment element is guided in the guide track.

It is conceivable and possible in this context to provide a single guide track, along which the adjustment element is guided. It is however also conceivable and possible for multiple guide tracks to be provided which are circumferentially offset with respect to one another and into which in each case one guide element of a casing part connected to the adjustment element engages, such that freely moving, defined guidance of the adjustment element relative to the cylinder part is provided, in the case of which jamming between the adjustment element and the cylinder part is ruled out.

The guide track extends along a portion of a helix. Owing to the guidance by means of the guide track, the adjustment element can thus, during adjustment, be moved axially in a gradual manner along a helical line provided by the helix. A rotational movement of the adjustment element is thus converted into an axial movement along the cylinder axis of the cylinder part, such that the adjustment element can be adjustable in freely moving fashion by means of a rotation with screw motion.

By means of the head portion situated in the cavity of the cylinder part, the adjustment element can be sealed off preferably in fluid-tight fashion with respect to the inner face of the cylinder part. For this purpose, the head portion is for example situated in the cavity of the cylinder part with such an accurate fit that air cannot flow past the head portion. It is thus not possible for air to flow past the head portion into the space formed between the negative-pressure element and the attachment component, such that, without adjustment of the adjustment element, the negative pressure in the space is maintained for reliable hold of the assemblies against one another.

The head portion may be situated in the cavity of the cylinder part with an accurate fit. It is however also conceivable and possible to provide an encircling seal, for example on the head portion, for the purposes of sealing off the transition between the head portion and the inner face of the cylinder part.

In one embodiment, the flow opening is formed on the cylinder part. During adjustment of the adjustment element out of the first position, the flow opening is opened up, such that an air flow can flow between the negative-pressure element and the attachment component, and a negative-pressure action between the negative-pressure element and the attachment component is thus eliminated. The flow opening performs the function of a valve, which when the negative-pressure element has been attached to the attachment component, is closed such that a negative-pressure action exists between the negative-pressure element and the attachment component. In order to open the connecting apparatus, the flow opening may be opened by adjustment of the adjustment element, such that an air flow can flow from the outside between the negative-pressure element and the attachment component. In this way, the holding forces of the connecting apparatus are eliminated, such that the assemblies is connected together by means of the connecting apparatus can be easily detached from one another.

The flow opening may be formed on the cylinder wall of the cylinder part at an axially set-back position, that is to say at a position which is arranged such that, when the negative-pressure element has been attached to the attachment component, the head portion of the adjustment element comes to lie between the flow opening and the attachment component, and thus closes a flow path between the flow opening and a space between the attachment component and the negative-pressure element. During adjustment, the adjustment element slides within the cavity of the cylinder part and passes over the flow opening, such that a flow path between the negative-pressure element and the attachment component is opened up, and air can thus flow in.

In one embodiment, the fastener module has an elastic preloading element which serves for preloading the adjustment element in the direction of the first position. The adjustment element is thus held resiliently elastically in the first position, for example by means of a compression spring which acts between the adjustment element and the cylinder part. During adjustment, the adjustment element is moved counter to the preloading action of the preloading element, such that, after the ending of the actuation, the adjustment element is automatically reset into its first position.

In one embodiment, it may be the intention for an attachment assembly to be secured to the attachment component of the second assembly, for example in the form of a planar attachment face, which attachment assembly has an attachment part with which the fastener module can be placed in interaction for the purposes of connecting the assemblies. The attachment assembly can improve the hold of the connecting apparatus and can in particular effect a defined position between the fastener module and the attachment component, in particular also for the purposes of supporting transverse forces that act between the fastener module and the attachment component.

For example, the adjustment element may have a first positive-locking portion and the attachment part may have a second positive-locking portion. The positive-locking portions, during attachment of the fastener module and of the attachment part to one another, engage with one another in positively locking fashion such that a transverse movement between the fastener module and the attachment component is blocked. By means of the positive-locking portions, it is thus possible in particular for a movement transversely with respect to an attachment direction, along which the fastener module and the attachment component can be attached to one another, to be blocked, such that forces acting in a transverse direction (that is to say forces acting in the plane of the attachment face) can be accommodated and supported.

Additionally or alternatively, by means of this attachment assembly, the fastener module may also be secured in terms of its rotational position, such that torsional forces can also be accommodated and supported. For this purpose, the negative-pressure element or an element connected to the negative-pressure element, for example the cylinder part, may have a first engagement portion, whereas the attachment part (on the other, second assembly) has a second engagement portion. The engagement portions, during attachment of the fastener module and of the attachment part to one another, engage with one another and thereby block a rotational movement of the negative-pressure element relative to the attachment part.

The engagement portions may be formed for example by a toothing (which preferably runs in encircling fashion at a circular edge portion) on the negative-pressure element or on the element connected to the negative-pressure element, on the one hand, and on the attachment part, on the other hand.

In one embodiment, the fastener module has a first magnet element for magnetically assisting the connection of the assemblies to one another. Said first magnet element may for example be arranged on the adjustment element and is thus moved together with the adjustment element. Alternatively or in addition, a magnet element may also be provided on the negative-pressure element or on an element connected to the negative-pressure element, for example the cylinder part.

By contrast, a second magnet element may be secured to the attachment component. A second magnet element of said type may for example be arranged on the attachment part and be arranged together with the attachment part on the attachment component. The magnet elements of the fastener module, on the one hand, and of the attachment component, on the other hand, serves for providing a magnetic attraction force during the attachment of the fastener module and of the attachment component to one another, such that the generation of the negative pressure is performed (preferably automatically) with magnetic assistance. During attachment, the fastener module and the attachment component are pulled toward one another with magnetic attraction owing to the magnetic interaction, such that a (near-)vacuum is effected between the negative-pressure element and the attachment component, for example by virtue of the negative-pressure element formed as elastic suction cup being pressed against the attachment component formed as attachment face.

If the first magnet element is arranged on the adjustment element, then, during adjustment of the adjustment element, the first magnet element is moved together with the adjustment element and can thus be moved away from the second magnet element on the attachment component, such that the magnetic attraction forces are weakened. By adjustment of the adjustment element, it is thus also the case that the magnetic holding forces are at least weakened, which can contribute to an easy, free-moving and haptically appealing opening action.

The first magnet element and the second magnet element may each be formed by a permanent magnet or else an arrangement of multiple permanent magnets, and may interact with magnetically attracting action in order to close the connecting apparatus by pointing with opposite magnetic poles toward one another. It is however also conceivable for one magnet element to be formed by a permanent magnet or an arrangement of multiple permanent magnets whilst the other magnet element is formed by a magnetic armature composed of a ferromagnetic material.

In one embodiment, the fastener module has one or more electrical contact elements which serve for electrical contacting with at least one counterpart contact element associated with the attachment component, when the fastener module, in the case of a closed connecting apparatus, has been attached to the attachment component. By means of the connecting apparatus, it is thus also possible to produce an electrical connection—in addition to a mechanical connection for holding assemblies against one another—which may be advantageous in particular if it is the intention to secure for example an electronic device to an associated assembly by means of the connecting apparatus. In this case, via one or more electrical contact elements, it is for example possible for currents to be conducted for an electrical supply for example for the purposes of charging the electronic device, or a data connection for the exchange of data signals may be provided.

The connecting apparatus is for example designed for securing an electronic device to an associated assembly. For example, the connecting apparatus may serve for securing a camera to a helmet, for example to a ski helmet or to a bicycle helmet. In another embodiment, the connecting apparatus may also serve for securing a mobile telephone or a navigation device or some other electronic communication or information device in a vehicle, for example to a windshield or to a dashboard.

The object is also achieved by means of an electronic device, in particular a camera or a mobile telephone, which has a connecting apparatus for the purposes of detachably connecting the electronic device to a further assembly. The connecting apparatus comprises a fastener module with a negative-pressure element, which negative-pressure element is connectable in an attachment direction to an attachment component for the purposes of connecting the electronic device to the further assembly and, in a connected position, interacts with the attachment component such that, in the event of loading of the fastener module and of the attachment component relative to one another counter to the attachment direction, the negative-pressure element and the attachment component are held against one another owing to an action of negative pressure between the negative-pressure element and the attachment component.

Provision is made here whereby the fastener module has a first magnet element for magnetically assisting the connection of the electronic device to the further assembly.

In one advantageous embodiment, the first magnet element is arranged on the negative-pressure element or on a component, connected to the negative-pressure element, of the fastener module. Additionally, a second magnet element may be securable to the attachment component and interact with the first magnet element such that an attachment of the fastener module to the attachment component is assisted by magnetic attraction.

The electronic device thus has a connecting apparatus which permits a simple but load-bearing connection of the electronic device to a further assembly (for example a helmet, in particular a sports helmet such as for example a ski helmet, or a vehicle, for example a bicycle or a motor vehicle, for example a dashboard in a vehicle interior of a motor vehicle). The connection of the electronic device to the further assembly is realized here by means of the connecting apparatus, the fastener module of which interacts firstly by negative-pressure action and secondly by magnetic interaction with the attachment component and is thus held in the connected position on the attachment component.

Owing to the negative-pressure action, in particular, shock loads can be advantageously accommodated and dissipated and do not lead to a detachment of the electronic device from the further assembly. By means of the magnetic interaction, the connecting apparatus can in particular be easily closed, with automatic generation of a negative-pressure action between the negative-pressure element and the attachment component.

The negative-pressure element preferably has a cup element which is elastic at least in certain portions, or is formed by a cup element of said type. The negative-pressure element can thus, during the attachment of the fastener module to the attachment component, be elastically deformed, which promotes a negative-pressure action between the negative-pressure element and the attachment component for secure hold.

In one embodiment, the fastener module has one or more electrical contact elements which serve for electrical contacting with one or more counterpart contact elements associated with the attachment component, when the fastener module, in the case of a closed connecting apparatus, has been attached to the attachment component. By means of the connecting apparatus, it is thus also possible to produce an electrical connection—in addition to a mechanical connection for holding the electronic device against an associated assemblies. Thus, via one or more electrical contact elements, it is for example possible for currents to be conducted for an electrical supply for example for the purposes of charging the electronic device, or a data connection for the exchange of data signals may be provided.

The object is also achieved by means of a helmet, in particular a sports helmet, for example a ski helmet, having a connecting apparatus for the purposes of detachably connecting the helmet to a further assembly. The connecting apparatus comprises a fastener module with a negative-pressure element, which negative-pressure element is connectable in an attachment direction to an attachment component for the purposes of connecting the helmet to the further assembly and, in a connected position, interacts with the attachment component such that, in the event of loading of the fastener module and of the attachment component relative to one another counter to the attachment direction, the negative-pressure element and the attachment component are held against one another owing to an action of negative pressure between the negative-pressure element and the attachment component. Provision is made here whereby the fastener module has a first magnet element for magnetically assisting the connection of the helmet to the further assembly.

In one advantageous embodiment, the first magnet element is arranged on the negative-pressure element or on a component, connected to the negative-pressure element, of the fastener module. Additionally, a second magnet element may be securable to the attachment component and interact with the first magnet element such that an attachment of the fastener module to the attachment component is assisted by magnetic attraction.

The helmet thus has a connecting apparatus which permits a simple but load-bearing connection of the helmet to a further assembly (for example an electronic device such as for example a camera or a mobile telephone). The connection of the helmet to the further assembly is realized here by means of the connecting apparatus, the fastener module of which interacts firstly by negative-pressure action and secondly by magnetic interaction with the attachment component and is thus held in the connected position on the attachment component.

Owing to the negative-pressure action, in particular, shock loads can be advantageously accommodated and dissipated and do not lead to a detachment of the helmet from the further assembly. By means of the magnetic interaction, the connecting apparatus can in particular be easily closed, with automatic generation of a negative-pressure action between the negative-pressure element and the attachment component.

The negative-pressure element preferably has a cup element which is elastic at least in certain portions, or is formed by a cup element of said type. The negative-pressure element can thus, during the attachment of the fastener module to the attachment component, be elastically deformed, which promotes a negative-pressure action between the negative-pressure element and the attachment component for secure hold.

In one embodiment, the fastener module has one or more electrical contact elements which serve for electrical contacting with one or more counterpart contact elements associated with the attachment component, when the fastener module, in the case of a closed connecting apparatus, has been attached to the attachment component. By means of the connecting apparatus, it is thus also possible to produce an electrical connection—in addition to a mechanical connection of the helmet to an associated assemblies. Thus, via one or more electrical contact elements, it is for example possible for currents to be conducted for an electrical supply for example for the purposes of charging an electronic device arranged on the helmet, or a data connection for the exchange of data signals may be provided.

The object is also achieved by means of a container, in particular a drinks bottle, which has a container body, a lid arrangeable on the container body, and a connecting apparatus for detachably connecting the lid to the container body. The connecting apparatus has a fastener module with a negative-pressure element, which negative-pressure element is connectable in an attachment direction to an attachment assembly for the purposes of connecting the lid to the container body and, in a connected position, interacts with the attachment assembly such that, in the event of loading of the lid and of the container body relative to one another counter to the attachment direction, the fastener module and the attachment assembly are held against one another owing to an action of negative pressure between the negative-pressure element and the attachment assembly.

The lid is thus connected by means of the connecting apparatus to the container body, wherein, in the connected position, the lid is held on the container body owing to a negative-pressure action between the fastener module and the attachment assembly. This can permit an easy attachment of the lid to the container body, with firm hold and a good sealing action between the lid and the container body in the closed state.

Here, the fastener module preferably has a first magnet element, whereas the attachment assembly has a second magnet element. The first magnet element and the second magnet element interact for the purposes of magnetically assisting the connection of the lid to the container body, such that the lid and the attachment assembly are magnetically pulled toward one another for the purposes of closing the container, and thus a connection between the lid and the container body is produced. In the connected position, there is then (also) a negative-pressure action between the negative-pressure element and the attachment assembly, such that, in the connected position, the lid is held on the container body firstly owing to the negative-pressure action and secondly magnetically.

In one embodiment, the fastener module is movable in an opening direction relative to the attachment assembly for the purposes of detaching the lid from the container body. For example, the fastener module may be rotatable relative to the attachment assembly about an axis of rotation.

Here, the opening of the connecting apparatus for the purposes of detaching the cover from the container body may be assisted by virtue of the fastener module having a multiplicity of first magnet elements and the attachment assembly having a multiplicity of second magnet elements. Here, the first magnet elements and the second magnet elements may for example be arranged in a manner uniformly distributed about the axis of rotation firstly on the fastener module and secondly on the attachment assembly, and may be alternately polarized, such that a first magnet element points for example with a north pole towards the attachment assembly, whereas an adjacent first magnet element points with a south pole towards the attachment assembly. In the connected position, the first magnet elements of the fastener module and the second magnet elements of the attachment assembly are situated with opposite poles facing one another, such that magnetic attraction exists between the magnet elements. By movement of the fastener module relative to the attachment assembly along the opening direction, however, identical poles of the magnet elements come to interact with one another, such that a magnetic repelling action between the magnet elements is generated, which may for example reduce, eliminate or even exceed a negative-pressure action between the negative-pressure element and the attachment assembly, such that an easy detachment of the lid from the container body is made possible.

The negative-pressure element preferably has a cup element which is elastic at least in certain portions, or is formed by a cup element of said type. The negative-pressure element can thus, during the attachment of the fastener module to the attachment assembly, be elastically deformed, which promotes a negative-pressure action between the negative-pressure element and the attachment assembly for secure hold.

In one embodiment, the fastener module is a constituent part of the lid, whereas the attachment assembly is arranged on the container body, for example is fixedly connected to the container body. The lid can thus, with the fastener module arranged thereon, be attached to the attachment assembly on the container body, in order to close the container.

BRIEF DESCRIPTION OF THE DRAWINGS

The concept underlying the invention will be discussed in more detail below on the basis of the exemplary embodiments illustrated in the figures, in which:

FIG. 2A shows a view of the connecting apparatus, during the attachment of a fastener module to an attachment component in the form of an attachment face on the helmet;

FIG. 2B shows a side view of the arrangement;

FIG. 2C shows a sectional view along the line A-A as per FIG. 2B;

FIG. 3A shows a view of the connecting apparatus, in the case of a fastener module attached to the attachment component;

FIG. 3B shows a side view of the arrangement;

FIG. 3C shows a sectional view along the line A-A as per FIG. 3B;

FIG. 4A shows a view of the connecting apparatus during the opening movement;

FIG. 4B shows a side view of the arrangement;

FIG. 4C shows a sectional view along the line A-A as per FIG. 4B;

FIG. 5A shows a view of the connecting apparatus during the further opening movement;

FIG. 5B shows a side view of the arrangement;

FIG. 5C shows a sectional view along the line A-A as per FIG. 5B;

FIG. 6A shows a view of the arrangement in the case of an opened connecting apparatus;

FIG. 6B shows a side view of the arrangement;

FIG. 6C shows a sectional view along the line A-A as per FIG. 6B;

FIG. 10A shows a view of the connecting apparatus during the opening movement for the release of the fastener module from the attachment component;

FIG. 10B shows a side view of the arrangement as per FIG. 10A;

FIG. 10C shows a sectional view along the line C-C as per FIG. 10B;

FIG. 12A shows a view of the fastener apparatus, in the case of a fastener module attached to an attachment component;

FIG. 12B shows a side view of the arrangement as per FIG. 12A;

FIG. 12C shows a sectional view along the line A-A as per FIG. 12B;

FIG. 15A shows an exploded view of an exemplary embodiment of a connecting apparatus on a container body for the purposes of connecting a lid to the container body;

FIG. 16A shows a view of the container body during the attachment of the lid;

FIG. 16B shows a side view of the arrangement as per FIG. 16A;

FIG. 16C shows a sectional view along the line F-F as per FIG. 16B;

FIG. 17A shows a view of the container body with the lid attached thereto;

FIG. 17B shows a side view of the arrangement as per FIG. 17A;

FIG. 17C shows a sectional view along the line C-C as per FIG. 17B;

FIG. 18A shows a view of the container body with the lid arranged thereon during the opening movement;

FIG. 18B shows a side view of the arrangement as per FIG. 18A;

FIG. 18C shows a sectional view along the line G-G as per FIG. 18B;

FIG. 19A shows a view of the container body with the lid removed;

FIG. 19B shows a side view of the arrangement as per FIG. 19A;

FIG. 19C shows a sectional view along the line E-E as per FIG. 19B;

FIG. 21A shows a view of the connecting apparatus, in the case of a fastener module attached to the attachment component;

FIG. 21B shows a side view of the arrangement as per FIG. 21A;

FIG. 21C shows a sectional view along the line A-A as per FIG. 21B;

FIG. 22A shows a view of the exemplary embodiment as per FIGS. 1A, 1B to 6A-6C, but with electrical contact elements on the fastener module and on the attachment assembly, in the case of a fastener module detached from the attachment assembly;

FIG. 22B shows a side view of the arrangement as per FIG. 22A;

FIG. 22C shows a sectional view along the line A-A as per FIG. 22B;

FIG. 23A shows the connecting apparatus during the attachment of the fastener module to the attachment assembly;

FIG. 23B shows a side view of the arrangement as per FIG. 23A;

FIG. 23C shows a sectional view along the line B-B as per FIG. 23B;

DETAILED DESCRIPTION

Figure 1A:
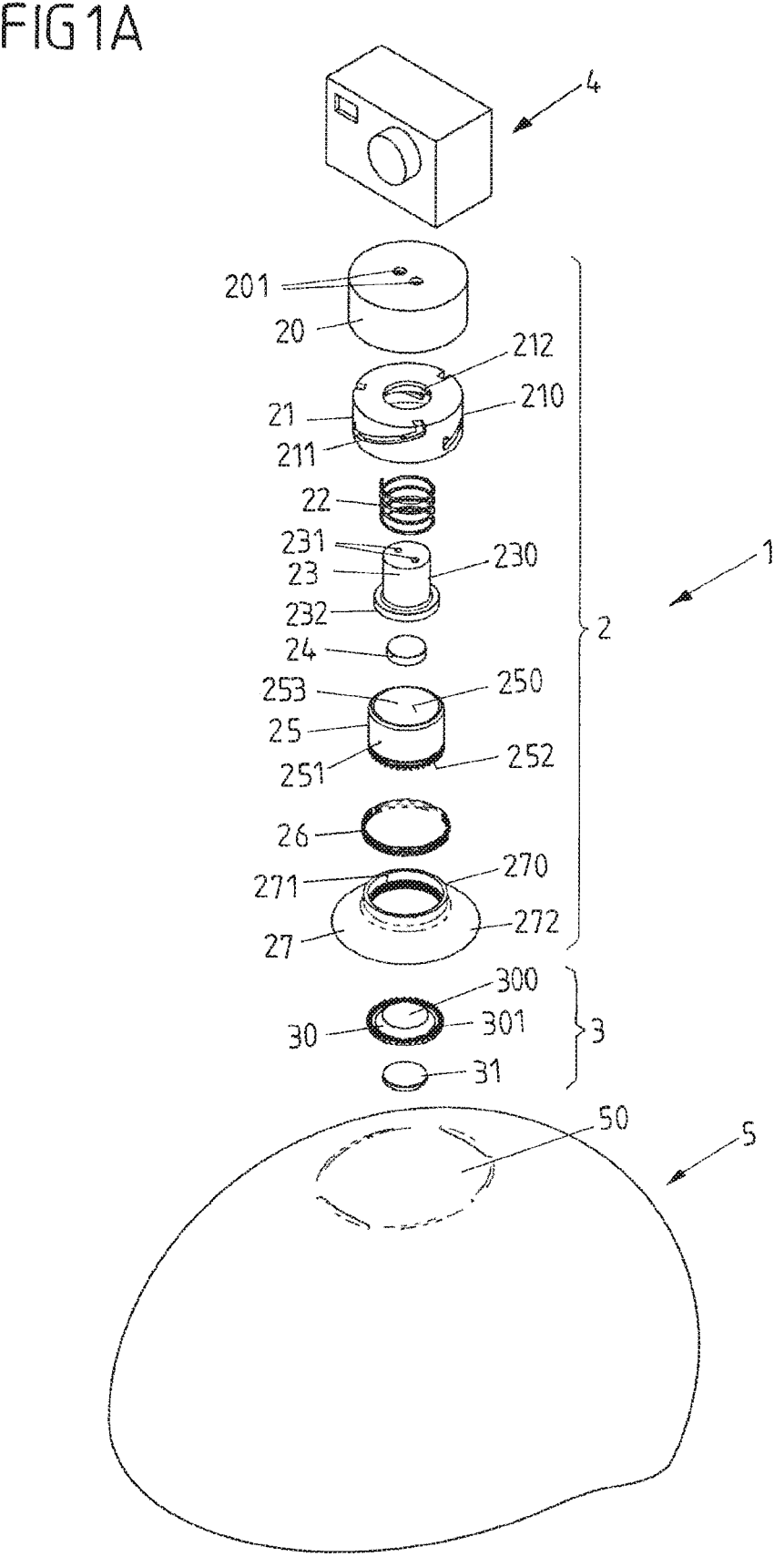
FIG. 1A shows an exploded view of an exemplary embodiment of a connecting apparatus for connecting a camera to a helmet.
Figure 1B:
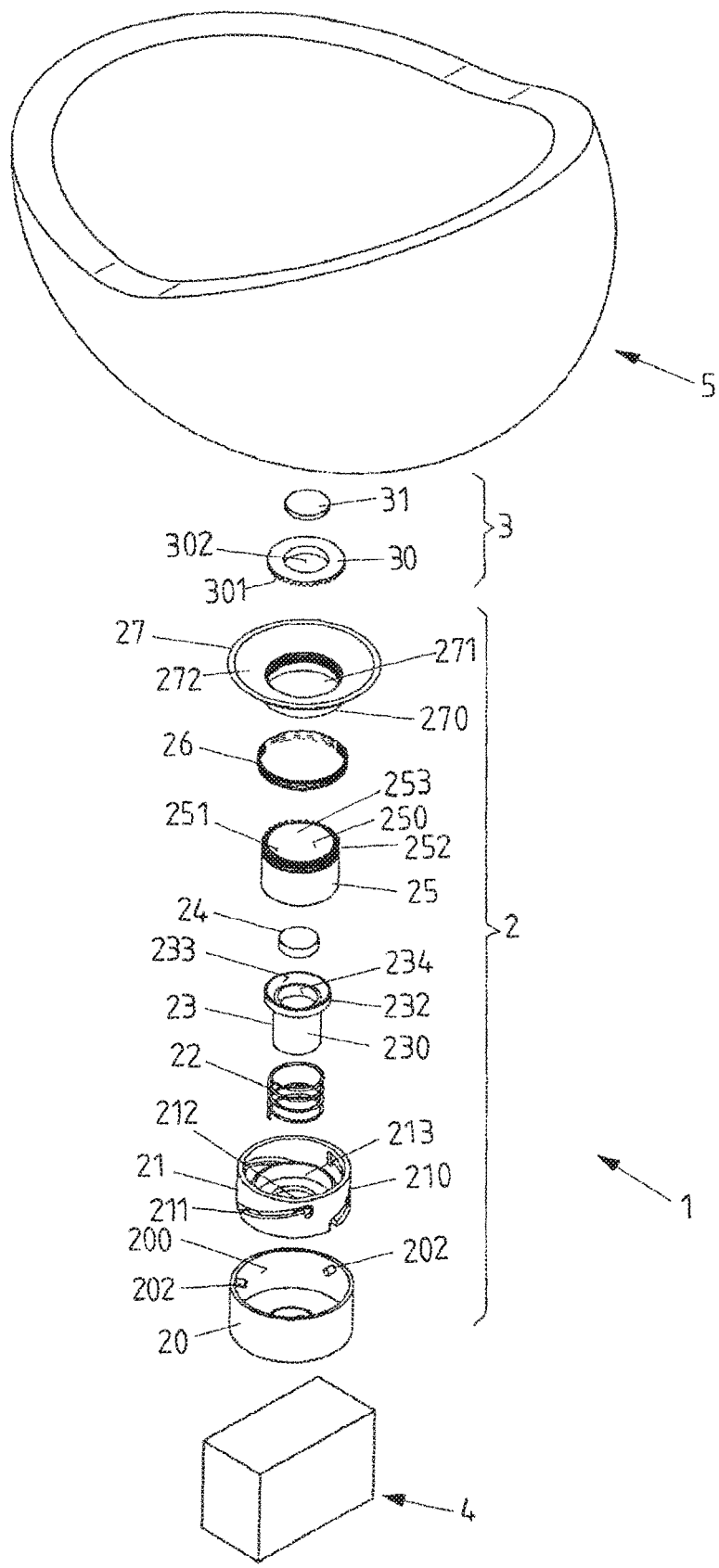
FIG. 1B shows the exploded views as per FIG. 1A from another perspective.

FIGS. 1A, 1B to 6A-6C show a first exemplary embodiment of a connecting apparatus 1 which—in the illustrated exemplary embodiment—serves for securing an electronic device in the form of a camera 4 to a helmet 5 (for example a ski or bicycle helmet). By means of the connecting apparatus 1, the camera 4 can be detachably connected to an attachment face 50 of the helmet 5, such that it is for example possible to make video recordings during the use of the helmet 5.

The connecting apparatus 1 has a fastener module 2 which can be attached to an attachment assembly 3 on the helmet 5. The fastener module 2 is composed of a multiplicity of parts which interact with one another and is fixed to the camera 4, wherein the connection of the fastener module 2 to the camera 4 may (likewise) be detachable in order to enable the connecting apparatus 1 to be used for example on different electronic devices.

The fastener module 2 has a casing part 20 which is of cylindrical form and which, by means of securing points 201, is fixedly connected to an adjustment element 23 accommodated centrally in the casing part 20.

The adjustment element 23 has a shank 230 and securing points 231 arranged thereon, by means of which securing points the adjustment element 23 is fixed to the casing part 20. At an end averted from the base of the casing part 20, the adjustment element 23 has a head portion 232, which projects radially outward beyond the shank 230.

The casing part 20 and the adjustment element 23 connected rotationally fixedly to the casing part 20 are fixedly connected to the camera 4.

As can be seen for example from the sectional view in FIG. 2C, the adjustment element 23 lies in a cylindrical cavity 253 of a cylinder part 25 such that the head portion 232 is guided slidingly on an inner face 250 of the cylinder part 25. The cylinder part 25, which is of cylindrical form with a circular cross section, is fixedly connected to a guide part 21 which has an opening 212 through which the adjustment element 23 engages by way of its shank 230. A collar 213 projects axially from a base of the guide part 21 facing toward the base of the casing part 20, into which collar the cylinder part 25 engages and by means of which collar the cylinder part 25 is fixedly connected to the guide part 21 (for example by welding or adhesive bonding).

The guide part 21 likewise has a cylindrical basic shape, with a cylindrical lateral face 210 which extends circumferentially around the cylinder part 25 received within the guide part 21 and which is thus arranged radially outside the cylinder part 25. On the lateral face 210 there are formed a multiplicity of parallel, helical guide tracks 211, which are circumferentially offset with respect to one another and which are formed as slots into the lateral face 210 and into which guide elements 202 (which project radially inward from a lateral face 200 of the casing part 20) in the form of studs on the casing part 20 engage. As a result of the engagement of the guide elements 202 of the casing part 20 into the guide tracks 211 of the guide part 21, the casing part 20 (and, via the latter, also the adjustment element 23) is positively guided on the guide part 21 about an axis of rotation R, such that, in the event of a rotation of the casing part 20 about the axis of rotation R, the structural unit formed from the casing part 20 and the adjustment element 23 follows the helical guide tracks 211, and the adjustment element 23 is thus moved axially within the cylinder part 25.

The cylinder part 25 is fixedly connected to a negative-pressure element 27 in the form of an elastic cup element 27, by virtue of the cylinder part 25 engaging into a collar 270 of the negative-pressure element 27 and being braced together with the negative-pressure element 27 by means of a circumferential bracing spring 26. The negative-pressure element 27 is thus connected fixedly, in particular also in fluid-tight fashion, to the cylinder part 20.

The adjustment element 23 is preloaded relative to the guide part 21, and thus relative to the cylinder part 25, in the direction of the initial position illustrated in FIG. 2C by means of a preloading element which engages around the shank 230 and which is in the form of a compression spring 22. In the initial position, the head portion 232 of the adjustment element 23 thus comes to lie against an end of the cylinder part 25, which end is averted from the guide part 21. In this position, the guide part 21 is retracted into the casing part 20 to a maximum extent.

The attachment face 50 on the helmet 5 serves for the attachment of the negative-pressure element 27 in the form of the cup element. Arranged on the attachment face 50 of the helmet 5 is the attachment assembly 3 with an attachment part 30 and with a magnet element 31 which is received in a receiving opening 302 of the attachment part 30. The fastener module 2 is attached to said attachment assembly 3 for the purposes of connecting the camera 4 to the helmet 5.

The fastener module 2 has a magnet element 24 which is received in a receiving opening 234 of the adjustment element 23 and which, during attachment of the fastener module 2 to the attachment face 50, interacts with magnetically attracting action with the magnet element 31 of the attachment assembly 3 such that the fastener module 2 (with the camera 4 arranged thereon) is pulled magnetically toward the attachment assembly 3 of the helmet 5. On the adjustment element 23, at that side of the head portion 232 which is averted from the casing part 20, there is formed a positive-locking portion 233 in the form of a conical depression which, during attachment of the fastener module 2, engages with an associated positive-locking portion 300 in the form of a conical elevation on the attachment part 30, such that the fastener module 2 is attached in a defined manner to the attachment assembly 3 of the helmet 5.

The positive locking between the positive-locking portions 233, 300 serves for expediently also enabling transverse forces in the plane of the attachment face 50 to be accommodated in the case of a closed connecting apparatus 1. Furthermore, by means of the positive locking, the fastener module 2 engages in a centered manner with the attachment assembly 3.

During attachment of the fastener module 2 to the attachment face 50, the negative-pressure element 27 is, as can be seen from the transition from FIGS. 2A-2C to FIGS. 3A-3C, elastically deformed at a cup-shaped edge portion 272 that projects radially beyond the cylinder part 25, whereby air escapes from a space B formed between the negative-pressure element 27 and the attachment face 50 and thus, in the event of loading of the fastener module 2, a negative pressure with suction action acts between the negative-pressure element 27 and the attachment face 50. In this way, impulse-like shock forces on the connecting apparatus 1 during the use of the helmet can be accommodated and dissipated such that the camera 4 is held securely and reliably on the helmet 5 even in the event of shock loading.

At an encircling edge, facing toward the attachment part 30, of the cylinder part 25, there is formed an engagement portion 252 in the form of a toothing which, during attachment of the fastener module 2 to the attachment assembly 3, engages in positively locking fashion with an encircling engagement portion 301 in the form of a toothing on the attachment part 30, as can be seen when viewing FIGS. 2C and 3C and FIGS. 1A and 1B together. In this way, the cylinder part 25, and via this also the guide part 21 and the negative-pressure element 27, is fixed rotationally fixedly to the attachment assembly 3 and thus to the helmet 5, such that torsional forces that act on the negative-pressure element 27 can also be accommodated and dissipated in an effective manner.

In the connected position, the camera 4 is thus fixed in a load-bearing manner to the helmet 5 by means of the connecting apparatus 1.

In order to open the connecting apparatus 1, the camera 4, and via this also the casing part 20 and the adjustment element 23 connected thereto, is rotated in a direction of rotation D about the axis of rotation R relative to the cylinder part 25, as illustrated in FIGS. 4A to 4C. Owing to the engagement of the engagement portions 252, 301 on the cylinder part 25 and on the attachment part 30, it is ensured that the cylinder part 23 cannot co-rotate during this rotational movement, and thus the adjustment element 23 is moved within the cylindrical cavity 253 of the cylinder part 25.

By rotation of the casing part 20 and guidance of the casing part 20 on the guide part 21, the adjustment element 23 is adjusted within the cylinder part 25 axially along the axis of rotation R and is thus, as can be seen from FIG. 4C, moved away from the attachment part 30. This has the effect firstly that the magnet elements 24, 31 are moved away from one another, such that the magnetic attraction force between the magnet elements 24, 31 is weakened. This also has the effect secondly that the head portion 232 slides within the cavity 253 and passes over a flow opening 251 in the wall of the cylinder part 25, such that an air flow F can flow into the space B through the flow opening 251 and a negative pressure in the space B is thus compensated. The holding force effected by the negative-pressure element 27 is eliminated in this way, such that—as illustrated in FIGS. 5A to 5C—the edge portion 272 of the negative-pressure element 27 is lifted off from the attachment face 50 and—as illustrated in FIGS. 6A to 6C—the fastener module 2 together with the camera 4 can be removed from the attachment face 50.

By means of the helical guidance of the casing part 20 on the guide part 21, the adjustment of the adjustment element 23 can be performed easily. The detachment of the connecting apparatus 1 can thus be haptically pleasant and comfortable for a user, with a high load-bearing capacity of the connecting apparatus 1 in the connected position.

If the fastener module 2 has been separated from the attachment assembly 3, then, owing to the preloading action of the preloading element 22 in the form of the compression spring, the adjustment element 23 is reset into its initial position, with the cylinder part 25 and the adjustment element 23 being rotated relative to one another. The fastener module 2 can thus be attached to the attachment assembly 3 again when desired.

By means of the head portion 232, which lies in (substantially) fluid-tight fashion in the cavity 253 of the cylinder part 25, a fluid-tight separation between the flow opening 251 and the space B formed between the negative-pressure element 27 and the attachment face 50 is created in the case of a connected connecting apparatus 1. By adjustment of the adjustment element 23 within the cavity 253, said flow opening 251 is placed in flow connection with the space B, such that air can flow into the space B and the connecting apparatus 1 can thus be separated.

A negative pressure between the negative-pressure element 27 and the attachment face 50 acts in particular in the event of shock-like, brief loading. As a result of loading (for example tensile loading) on the fastener module 2, a force acts in the direction of an enlargement of the space B, which leads to a negative pressure in said space B. By means of the negative-pressure element 27 which bears areally with sealing action against the attachment face 50, it is thus possible in particular for shock-like acting loads to be accommodated in an effective manner.

Hold is additionally provided by means of the magnet elements 24, 31, such that the fastener module 2 is also held with magnetically attracting action against the attachment assembly 3. Here, the magnet elements 24, 31 additionally assist the attachment of the fastener module 2 and of the attachment assembly 3 to one another, with the negative-pressure element 27 being pressed against the attachment face 50.

Because a negative pressure that is generated between the negative-pressure element 27 and the attachment face 50 acts in particular in the event of shock-like loading, it is also possible by means of the connecting apparatus 1 to ensure an emergency breakaway in the event of greater loading which lasts for a longer period of time. It is thus possible, for example in the event of an exceedance of a (predetermined) threshold force, for the camera 4 to be broken away from the helmet 5, with the negative-pressure element 27 being detached from the attachment face 50. For this purpose, the negative-pressure element 27 and the negative-pressure force provided at the negative-pressure element 27 may be dimensioned correspondingly.

Figure 7A:
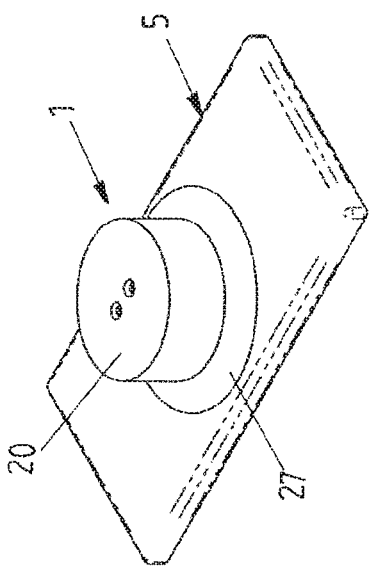
FIG. 7A shows a view of the connecting apparatus when used for securing a mobile telephone.
Figure 7C:
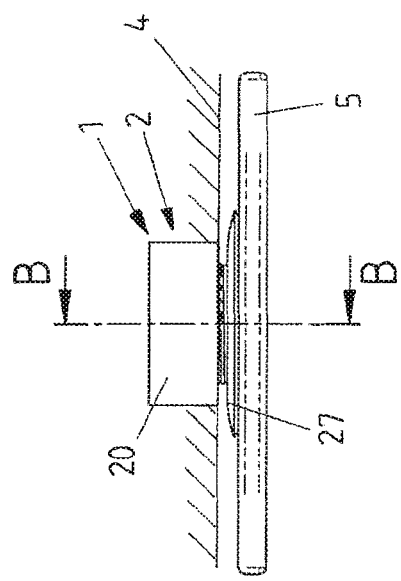
FIG. 7C shows a sectional view along the line B-B as per FIG. 7B.
Figure 7B:
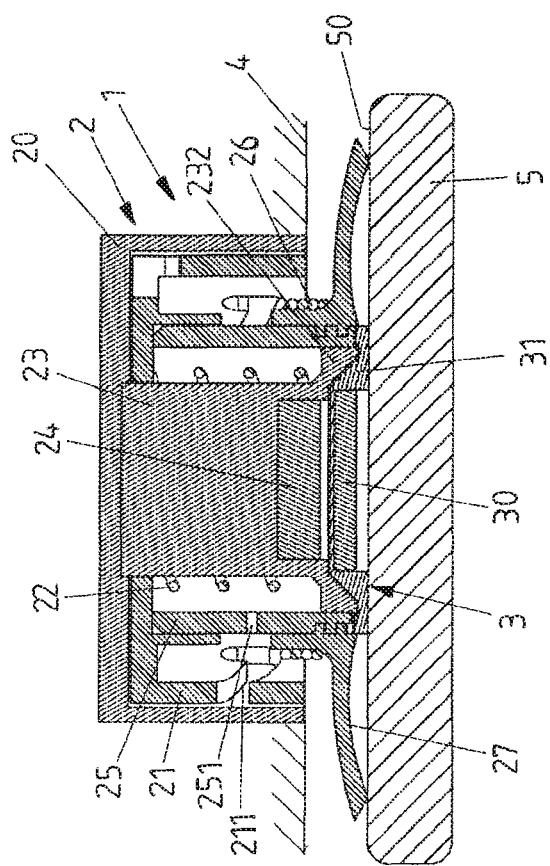
FIG. 7B shows a side view of the arrangement as per FIG. 7A.
Figure 8A:
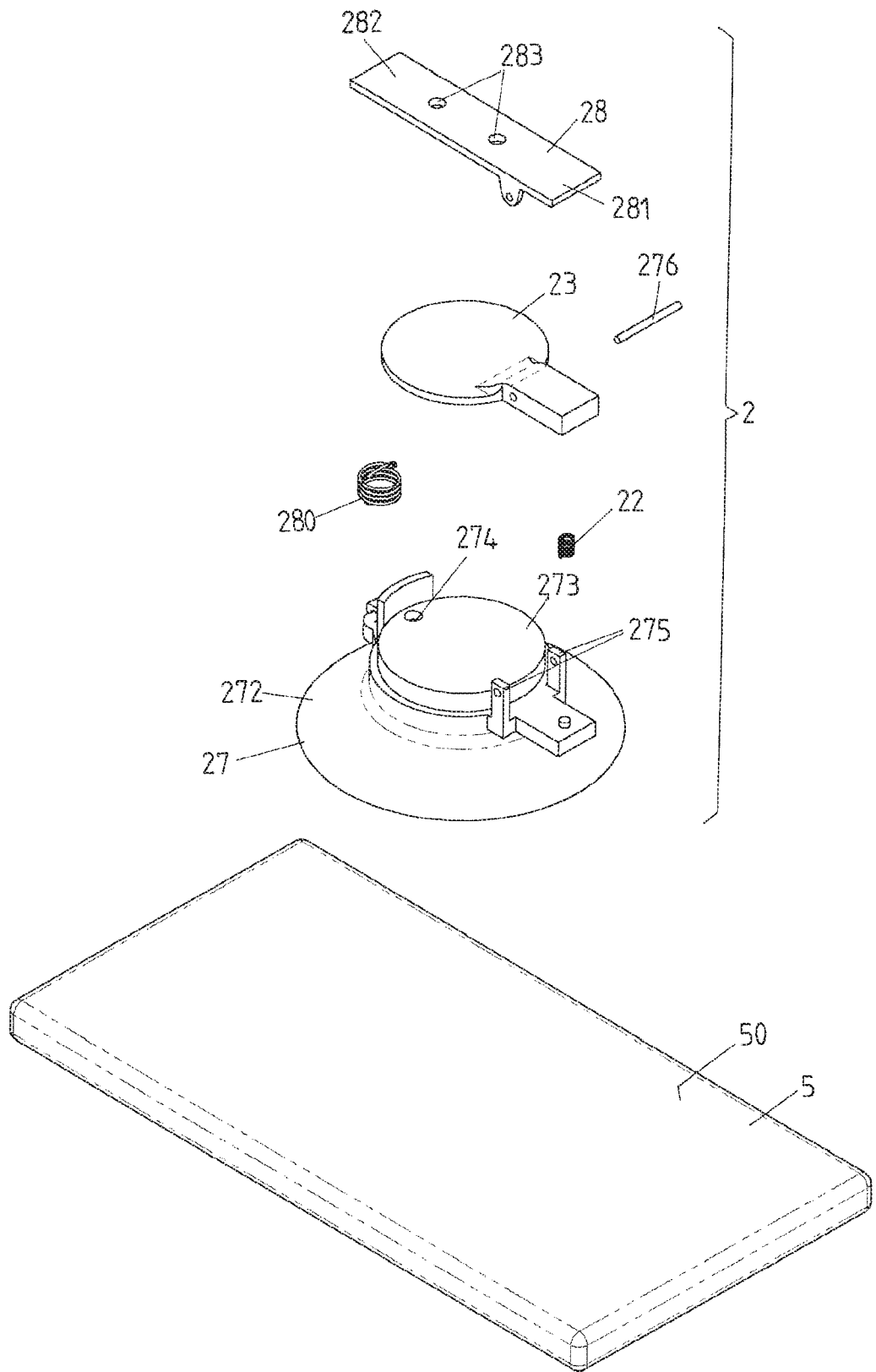
FIG. 8A shows an exploded view of a further exemplary embodiment of a connecting apparatus for connecting two assemblies to one another, for example an electronic device in the form of a mobile telephone to another assembly, for example to a dashboard of a vehicle.
Figure 8B:
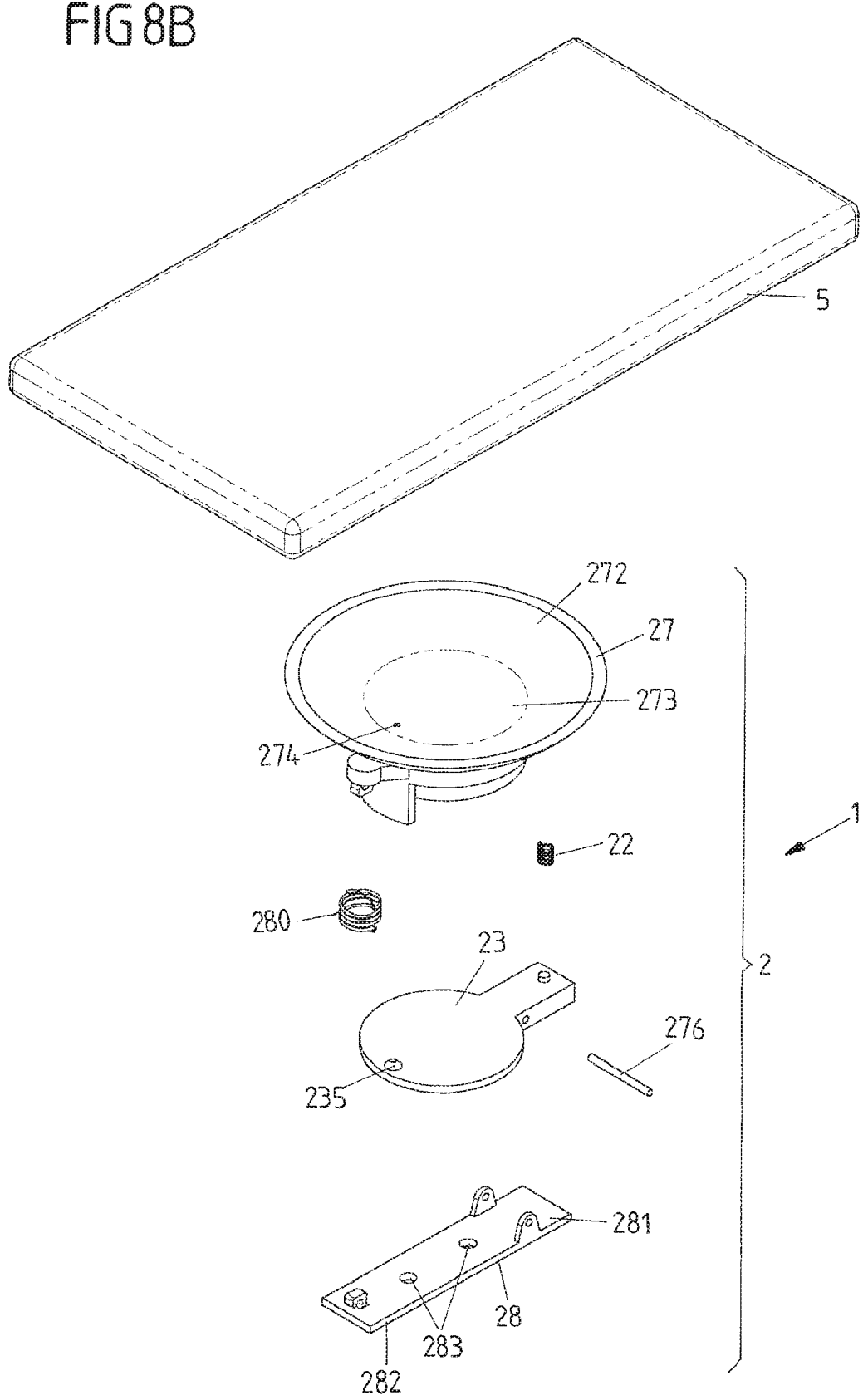
FIG. 8B shows another exploded view of the connecting apparatus.

In another exemplary embodiment, illustrated in FIGS. 7A to 7C, the connecting apparatus 1 serves for securing a mobile telephone 5 or some other electronic device (for example a navigation device) for example in a vehicle, for example to the dashboard or to the windshield of the vehicle. In this case, the attachment assembly 3 may for example be arranged on a casing face, which serves as attachment face 50, of the mobile telephone 5 or of the other electronic device, whereas the fastener module 2 is arranged on the vehicle, for example by virtue of the fastener module 2 being at least partially integrated, and thus recessed, into a dashboard.

Otherwise, the exemplary embodiment as per FIGS. 7A to 7C is identical to that described above, such that reference is made to the above statements in their entirety.

In an exemplary embodiment of a connecting apparatus 1 illustrated in FIGS. 8A, 8B to 10A-10C, a fastener module 2 is provided for attachment to an attachment component 50 in the form of an attachment face on an electronic device 5 or some other assembly.

The fastener module 2 has a negative-pressure element 27, which has a flexible edge portion 272 and which is provided for being connected by means of the flexible edge portion 272, with elastic deformation for the purposes of providing a negative-pressure action, to the attachment component 50 in the form of the attachment face on the assembly 5. The flexible edge portion 272 extends circumferentially as a cup element around a body 273 on which a flow opening 274 is formed and on which an adjustment element 23 in the form of a flap element is mounted in articulated fashion by means of bearing elements 275 and an axle element 276.

Also arranged on the axle element 276 is an actuation element 28, which interacts with the adjustment element 23 in the form of the flap element in order to actuate the adjustment element 23 for the purposes of detaching the fastener module 2 from the attachment component 50.

Figure 9A:
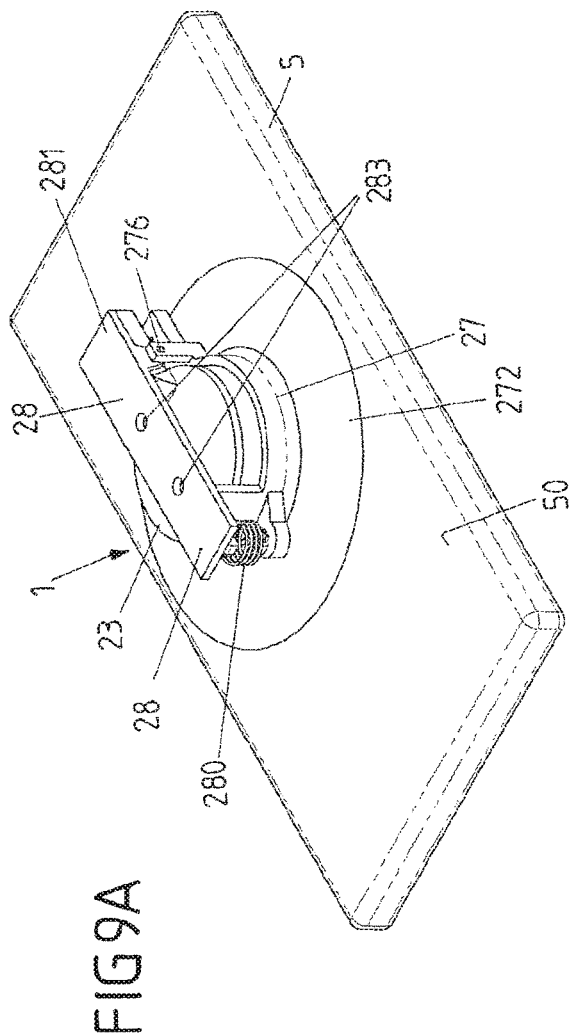
FIG. 9A shows a view of the connecting apparatus, in the case of a fastener module attached to an attachment component.
Figure 9C:
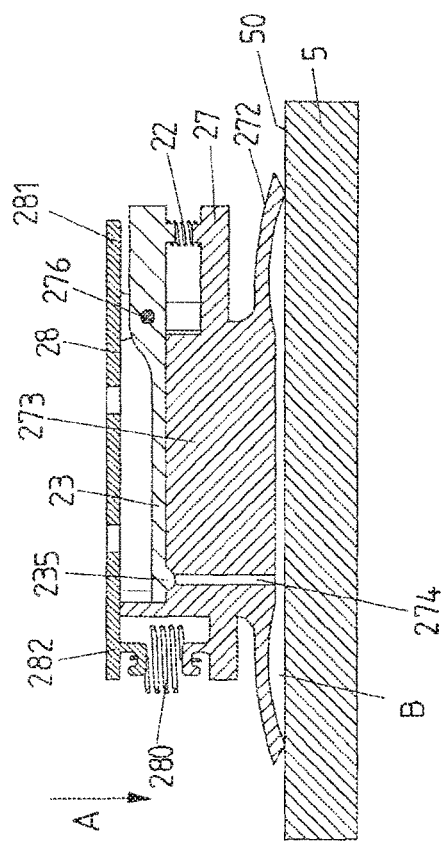
FIG. 9C shows a sectional view along the line A-A as per FIG. 9B.
Figure 9B:
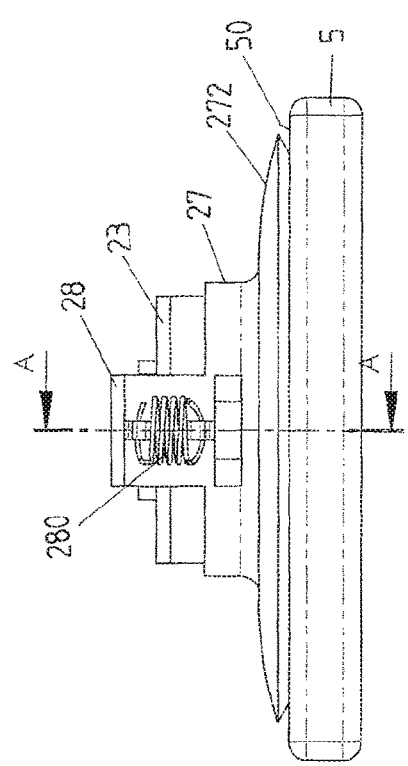
FIG. 9B shows a side view of the arrangement as per FIG. 9A.
Figure 11A:
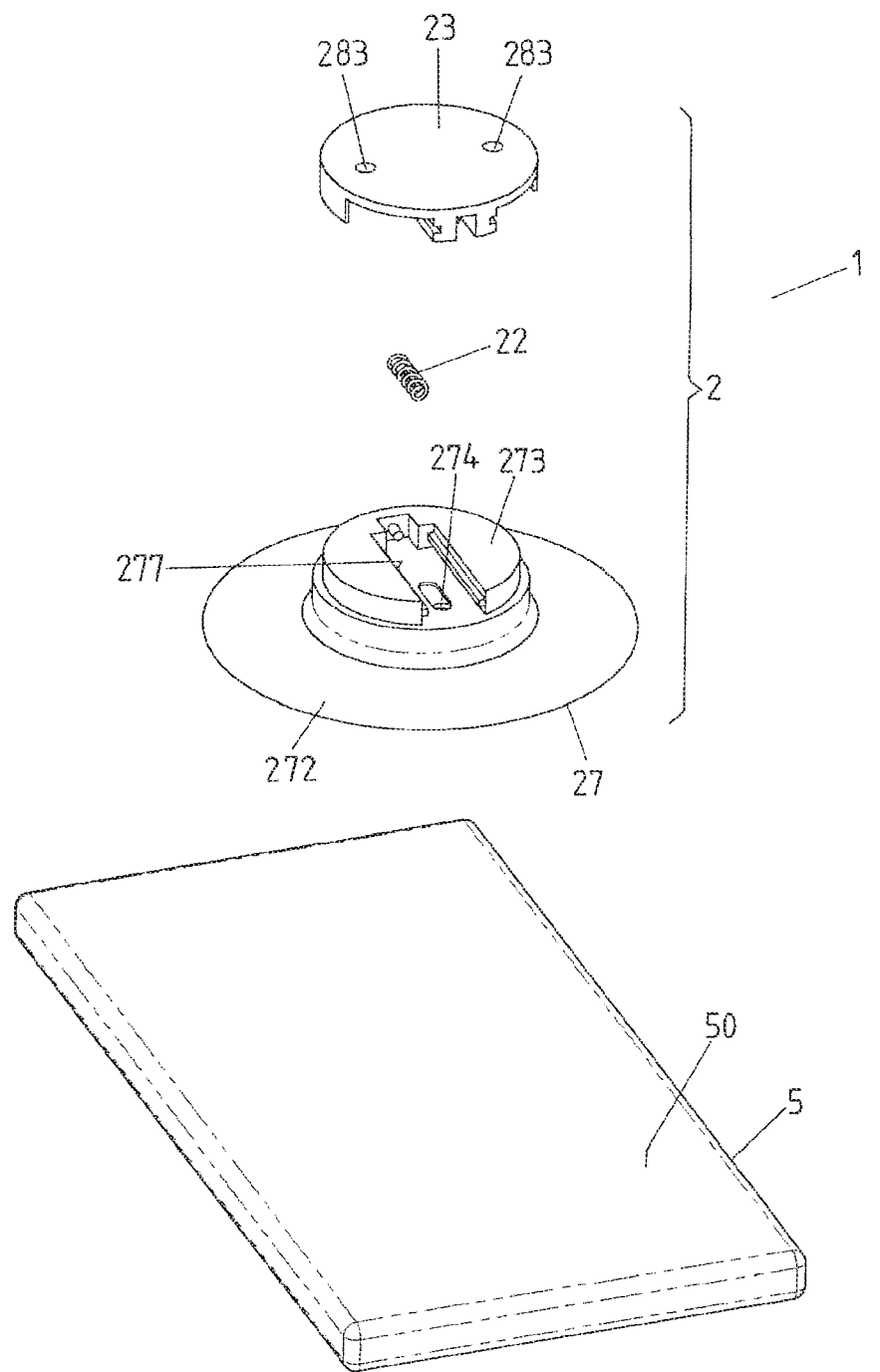
FIG. 11A shows an exploded view of a further exemplary embodiment of a connecting apparatus.
Figure 11B:
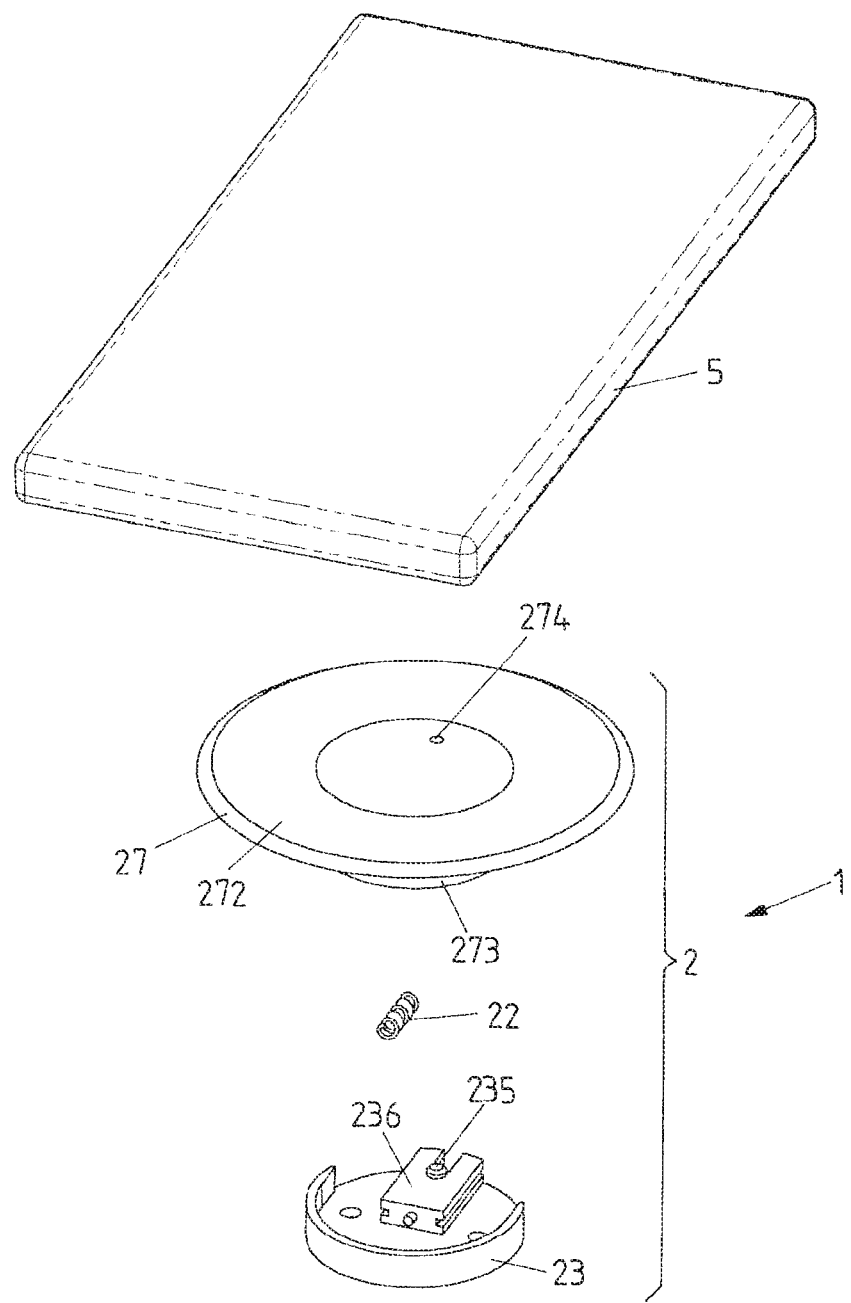
FIG. 11B shows another exploded view of the connecting apparatus.

As can be seen for example from FIG. 9A and FIG. 9C, the actuation element 28 is spring-preloaded in the direction of an initial position illustrated in FIGS. 9A-9C by means of a spring element 280 in the form of a tension spring. Furthermore, the adjustment element 23 is spring-preloaded by means of a preloading element 22 in the form of a compression spring into the closed position illustrated in FIGS. 9A-9C, in which the adjustment element 23 closes the flow opening 274 in the body 273 of the negative-pressure element 27 in a fluid-tight manner by means of a closing element 235 which engages into the flow opening 274 and which is in the form of a stud, such that, in particular, no air can flow through the flow opening 274 between the negative-pressure element 27 and the attachment component 50.

In the position illustrated in FIGS. 9A-9C, in which the fastener module 2 is attached to the attachment component 50 of the assembly 5, there is a negative-pressure action between the negative-pressure element 27 and the attachment component 50. Owing to this negative-pressure action, the fastener module 2 is held on the attachment component 50, such that the fastener module 2 cannot be readily removed, at any rate cannot be removed without eliminating the negative-pressure action, from the attachment component 50.

On the actuation element 28, there are provided fastening points 283 in the form of, for example, screw holes, by means of which the actuation element 28 can be connected to an associated further assembly. For example, in this way, the actuation element 28 can be fixed to a vehicle, for example to a dashboard of a motor vehicle, in order to thereby (detachably) fix an assembly 5, which realizes for example an electronic device in the form of a mobile telephone or the like, to the vehicle.

In order to detach the fastener module 2 from the attachment component 50, the adjustment element 23 is adjusted, by actuation of the actuation element 28, such that the flow opening 274 is opened up and an air flow can flow through the flow opening 274 between the negative-pressure element 27 and the attachment component 50, as illustrated in FIGS. 10A-10C. A negative-pressure action between the negative-pressure element 27 and the attachment component 50 is thus eliminated, such that no (further) holding forces act between the fastener module 2 and the attachment component 50.

For the actuation, the actuation element 28 is tilted about the axle element 276 relative to the negative-pressure element 27, as can be seen from FIGS. 10A-10C. As a result, the actuation element 28 acts with a portion 281 remote from the top end 282 on the adjustment element 23, and pivots the latter likewise about the axle element 276. The adjustment element 23 is thus—indirectly via the actuation element 28—moved out of its closed position and opens up the flow opening 274, such that fastener module 2 can be detached from the attachment component 50.

In the event of actuation of the actuation element 28, the spring element 280 is subjected to tensile loading, as can be seen from FIGS. 10A-10C. Furthermore, the preloading element 22 is subjected to compressive loading. After the ending of the actuation, the actuation element 28 and the adjustment element 23 thus return into their respective initial position, illustrated in FIGS. 9A-9C, owing to the spring action, such that, in the case of a non-actuated actuation element 28, the flow opening 274 is closed, and the negative-pressure element 27 can thus be attached to an attachment component 50 for renewed connection of the fastener module 2.

In the exemplary embodiment as per FIGS. 8A, 8B to 10A-10C, magnet elements may be arranged firstly on the fastener module 2 and secondly on the attachment component 50 in order to magnetically assist attachment of the fastener module 2 to the attachment component 50. This is however not imperative. The connecting apparatus 1 may also be of non-magnetic design and effect hold of the fastener module 2 on the attachment component 50 owing to the negative-pressure action alone.

In an exemplary embodiment illustrated in FIGS. 11A, 11B to 13A-13C, by contrast to the exemplary embodiment as per FIGS. 8A, 8B to 10A-10C, an adjustment element 23 is arranged displaceably on a negative-pressure element 27 of a fastener module 2 of a connecting apparatus 1. The negative-pressure element 27 again has a flexible, elastically deformable edge portion 272 in the form of a cup element, by means of which the negative-pressure element 27 can be attached to an areal attachment component 50 of an assembly 5 in order, in an attached position (FIGS. 12A-12C), to effect hold of the fastener module 2 on the attachment component 50 owing to a negative-pressure action.

In this exemplary embodiment, an adjustment element 23 is guided on a body 273 of the negative-pressure element 27 so as to be displaceable along a guide direction extending transversely with respect to an attachment direction A, by virtue of the adjustment element 23 engaging by means of a guide piece 236 into an associated guide device 277 on the body 273 of the negative-pressure element 27.

In an initial position illustrated in FIGS. 12A-12C, the adjustment element 23 closes a flow opening 274 in the body 273 by means of a closing element 235 in the form of a stud, such that a negative-pressure action between the negative-pressure element 27 and the attachment component 50 exists for hold of the fastener module 2 on the attachment component 50 when the fastener module 2 is attached to the attachment component 50. In particular, in the case of a closed flow opening 274, an inflow of air between the negative-pressure element 27 and the attachment component 50 via the flow opening 274 is prevented.

Figure 13A:
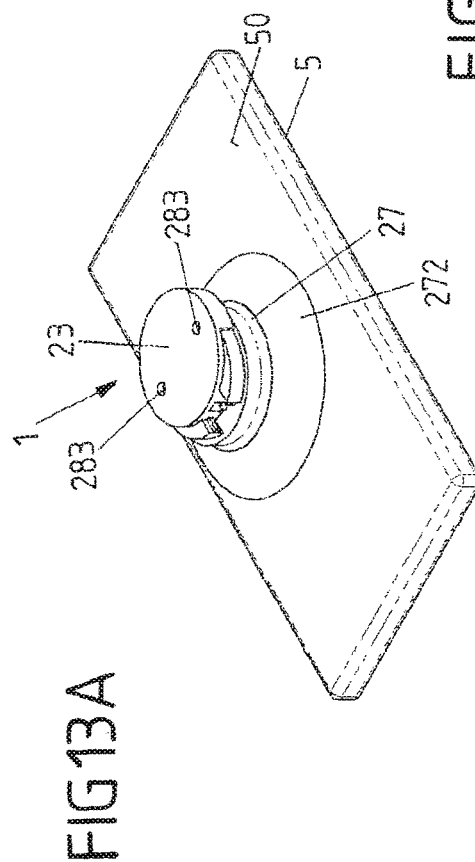
FIG. 13A shows a view of the connecting apparatus during the opening movement for the release of the fastener module from the attachment component.
Figure 13C:
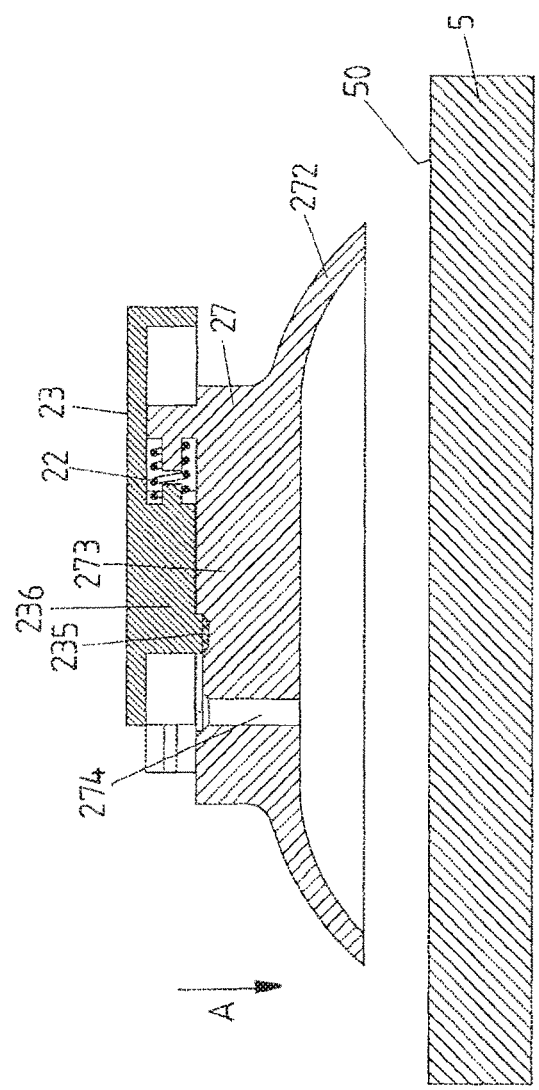
FIG. 13C shows a sectional view along the line B-B as per FIG. 13B.
Figure 13B:
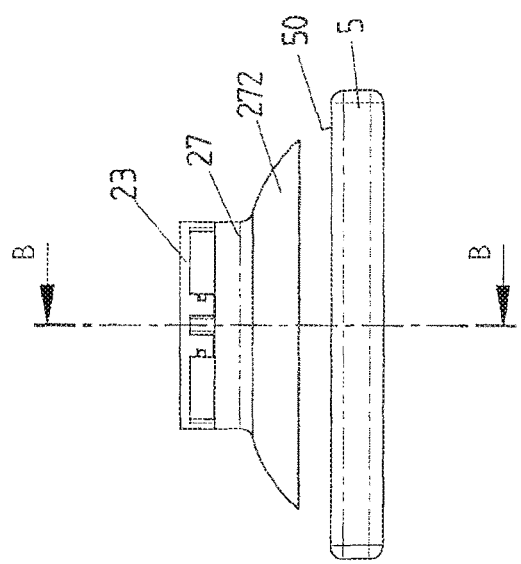
FIG. 13B shows a side view of the arrangement as per FIG. 13A.

In order to detach the fastener module 2 from the attachment component 50, the adjustment element 23 can be displaced transversely with respect to the attachment direction A on the body 273 of the negative-pressure element 27, as illustrated in FIGS. 13A-13C. In this way, a preloading element in the form of a compression spring, which acts between the adjustment element 23 and the negative-pressure element 27, is braced under pressure, and the flow opening 274 is opened up, such that an air flow can flow between the negative-pressure element 27 and the attachment component 50 and a negative-pressure action between the negative-pressure element 27 and the attachment component 50 is thus eliminated.

After the ending of the actuation, the adjustment element 23 is, owing to the pressure action of the preloading element 27, automatically reset into the initial position as per FIGS. 12A-12C, such that, in the initial position, in the case of a non-actuated adjustment element 23, the flow opening 274 is again closed, and the fastener module 2 can thus be attached again to an associated attachment component 50 of an assembly 5.

The adjustment element 23 has securing points 283, by means of which an associated assembly can be secured to the adjustment element 23. An actuation of the adjustment element 23 thus occurs in the event of a relative movement between the assembly that is connected to the adjustment element 23 and the assembly 5 to which the fastener module 2 is attached. For example, a user can act on the assembly 5 in order to thereby displace the adjustment element 23 relative to the negative-pressure element 27 and thus detach the assembly 5 from the fastener module 2.

The assembly 5 may again be, for example, an electronic device in the form of a mobile telephone or the like. The adjustment element 23 may, by contrast, be fixed for example to a vehicle, for example to a dashboard of a motor vehicle, such that the assembly 5 can be detachably secured to the vehicle by means of the connecting apparatus 1.

In the above-described exemplary embodiments, the negative-pressure element is in the form of an elastic cup element. This is however not imperative. It is basically also possible for rigid, non-elastic elements to interact so as to effect a negative pressure and thus so as to provide a holding force.

Figure 14:
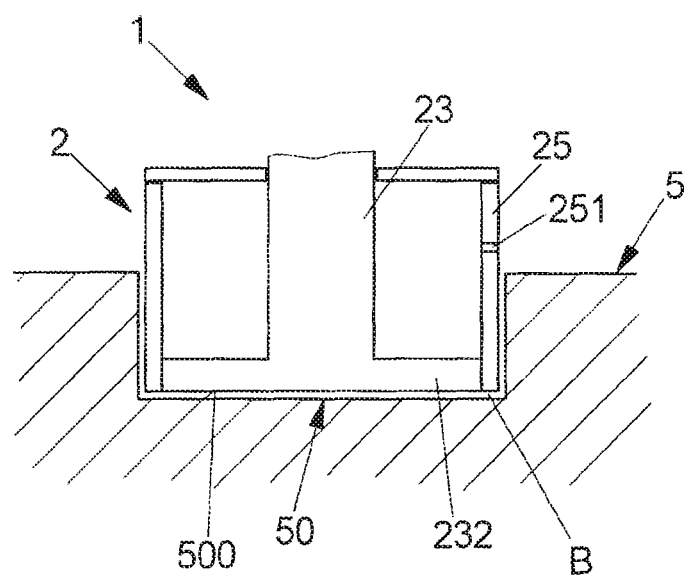
FIG. 14 shows a schematic view of another exemplary embodiment of a connecting apparatus.
Figure 15B:
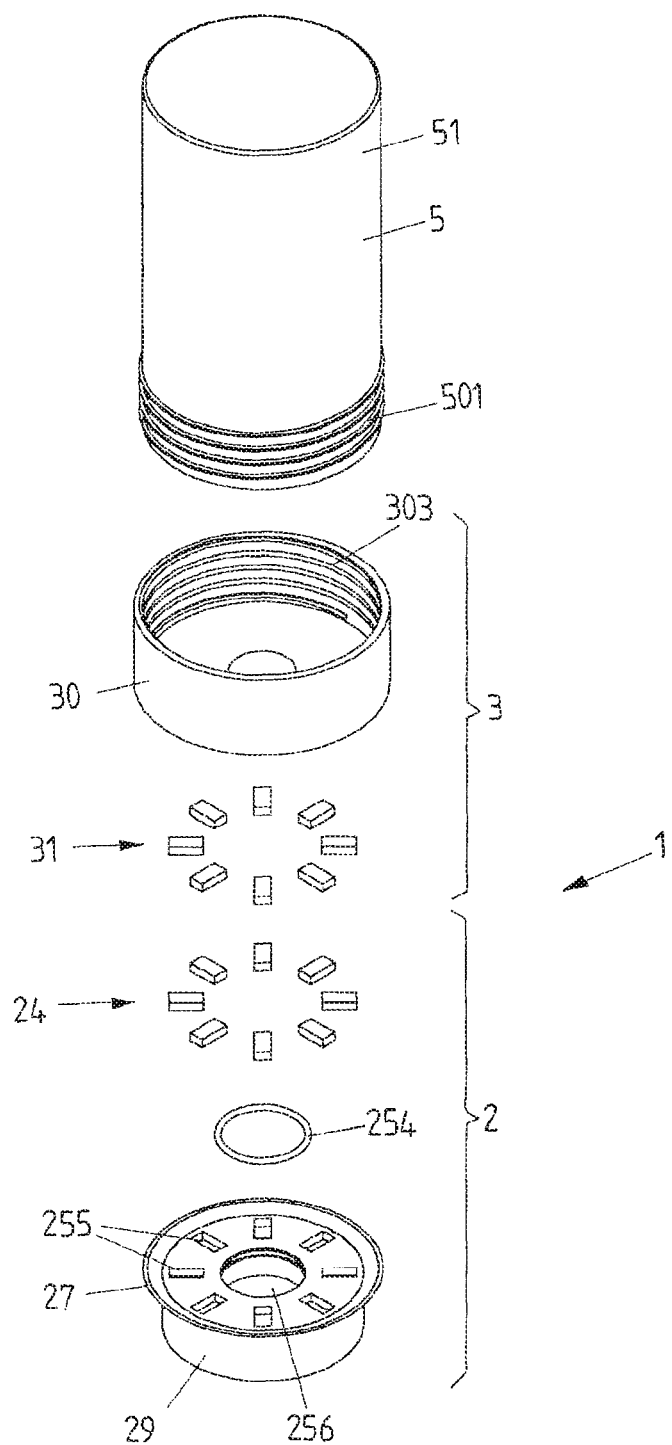
FIG. 15B shows another exploded view of the arrangement as per FIG. 15A.

This is illustrated by way of example in a schematic illustration of an exemplary embodiment in FIG. 14.

The connecting apparatus 1 has a fastener module 2 that can be attached to an assembly 5. For example, the fastener module 2 of the connecting apparatus 1, which fastener module is of rigid and inelastic form, may be inserted in an accurately fitting manner into an attachment component 50 in the form of an opening 500 formed in the assembly 5, such that the cylinder part 23 is received in substantially fluid-tight fashion within the opening 500. In the event of loading of the fastener module 2, a negative pressure is generated between the cylinder part 25 and the walls of the opening 500, such that the fastener module 2 is fixed to the assembly 5. An adjustment element 23 which is adjustable within the cylinder part 25 can be adjusted in a manner entirely analogous to that described above in order, for the purposes of detaching the connecting apparatus 1, to open up a flow path between a flow opening 251 in the cylinder part 25 and a space formed between the cylinder part 25 and the walls of the opening 500, such that air can flow into the space and the cylinder part 25 can thus be removed from the opening 500.

The cylinder part 25 may be provided for being inserted in an accurately fitting manner into the opening 500 and thus effect a fluid-tight transition between the cylinder part 25 and the walls of the opening 500. Here, the cylinder part 25 may be of circular cylindrical external shape, wherein the cylinder part 25 may also have some other external shape, for example a polygonal external shape or any desired other cross-sectional shape.

It is additionally also conceivable and possible for one or more encircling sealing rings in the form of sealing lips or the like to be provided for example on the outer side of the cylinder part 25, which sealing rings seal off the transition between the cylinder part 25 and the walls of the opening 500 in fluid-tight fashion.

FIGS. 15A, 15B to 19A-19C show an exemplary embodiment of a container in the form of a drinks bottle, in the case of which a container body 51 of an assembly 5 can be connected to a lid 29 in order to close the container body 51. The lid 29 is a constituent part of a fastener module 2 of a connecting apparatus 1, by means of which the lid 29 can be connected fixedly but detachably to the container body 51.

The connecting apparatus 1 is formed by the fastener module 2, a constituent part of which is the lid 29, and an attachment assembly 3 with an attachment part 30, which is provided for being connected by means of a thread 501 to the container body 51. The attachment part 30 has a positive-locking portion 300 in the form of a protruding stud piece which has a central opening through which a user can for example drink from the drinks bottle when the lid 29 has been removed.

The lid 29 of the fastener module 2 forms, together with a flexible, circumferential edge portion 272, a negative-pressure element 27 which can be attached in an attachment direction A to the attachment part 30 of the attachment assembly 3 and which, in the attached position (FIGS. 17A-17C), is held against the attachment part 30 under negative-pressure action. Formed on the inside of the lid 29 is an engagement opening 256 into which, when the fastener module 2 has been attached, the positive-locking portion 300 of the attachment part 30 engages. Arranged on the inner lateral face of the engagement opening 256 is a seal 254 in the form of an O-ring, which closes off a transition between the lid 29 and the positive-locking portion 300 in fluid-tight, in particular moisture-tight, fashion, such that liquid cannot egress from the container a 50 when the lid 29 has been attached to the container body 51.

On a surface 304 facing toward the cover 21, the attachment part 30 has receiving openings 302 into which magnet elements 31 are inserted and connected to the attachment part 30. Likewise, on the inner side of the lid 29, there are formed receiving openings 255 into which magnet elements 24 are inserted and thus held on the lid 29.

The magnet elements 31 on the attachment part 30, on the one hand, and the magnet elements 24 on the lid 29, on the other hand, are, viewed in a circumferential direction around the attachment direction A, distributed uniformly with respect to one another and alternately polarized. A magnet elements 31 of the attachment part 30 thus points with a north pole N toward the cover 29, whereas adjacent magnet elements 31 point in each case with a south pole S toward the lid 29, and are then followed again by north poles N. Likewise, a magnet element 24 of the lid 29 points with a south pole S toward the attachment part 30, whereas adjacent magnet elements 24 each point with a north pole N toward the attachment part 30, and then followed again by south poles S.

During attachment of the lid 29 to the attachment part 30 for the purposes of closing the drinks bottle, opposite poles of the magnet elements 24, 31 attract one another, such that the lid 29 is pulled toward the attachment part 30, and in the process the positive-locking portion 300 engages with the engagement opening 256 and, with elastic deformation of the flexible edge portion 272, a negative-pressure action is provided between the lid 29 and the attachment part 30 (see the transition from FIGS. 16A-16C to the attached position as per FIGS. 17A-17C). In the attached position (FIGS. 17A-17C), the lid 29 is thus held on the attachment part 30 firstly owing to the magnetic attraction between the magnet elements 24, 31 and furthermore owing to negative-pressure action.

In order to detach the lid 29 from the attachment part 30 and thus from the container body 51, the lid 29 can be rotated along an opening direction O, along which the lid 29 is rotatable about an axis of rotation R, defined by the engagement of the positive-locking portion 300 into the engagement opening 256, relative to the attachment part 30, whereby the magnet elements 24, 31 of identical polarity are moved closer together and thus a magnetic repelling action is generated between the magnet elements 24, 31. This magnetic repelling action may weaken or even exceed the negative-pressure action between the lid 29 and the attachment part 30, such that the lid 29 can be easily detached from the attachment part 30 counter to the attachment direction A, and the drinks bottle can thus be opened. This is illustrated in the transition from FIGS. 18A-18C to FIGS. 19A-19C. During this rotation, a flow opening may also be opened.

A connection of a lid 29 to a container 5 of the described type is not only conceivable and possible in the case of a drinks bottle, for example for use on a bicycle, but may also be used on entirely different, arbitrary containers that are to be closed by means of a lid.

FIGS. 20A-20C and 21A-21C show an exemplary embodiment of a connecting apparatus 1 which has a fastener module 2 with a negative-pressure element 27 which can be attached in an attachment direction A to an attachment part 30 of an attachment assembly 3 connected to an assembly 5. A further assembly may be connected to the negative-pressure element 27, such that, by means of the connecting apparatus 1, the assembly 5, for example an electronic device in the form of a mobile telephone, can be arranged on the further assembly.

The negative-pressure element 27 has a flexible edge portion 272 in the form of a cup element. Furthermore, on a body 273, there is arranged a magnet element 24 which, during the attachment of the fastener module 2 to the attachment assembly 3, interacts with magnetically attracting action with a magnet element 31 on the attachment part 30 of the attachment assembly 3, and thus magnetically assists the attachment of the fastener module 2 to the attachment assembly 3.

In an attached position (FIGS. 21A-21C), a negative-pressure action exists between the negative-pressure element 27 of the fastener module 2 and an attachment component 50 of the assembly 5 on which the attachment assembly 3 is arranged, owing to elastic deformation of the flexible edge portion 272 and the creation of a (near-) vacuum between the negative-pressure element 27 and the attachment component 50.

The detachment of the fastener module 2 from the attachment assembly 3 is realized in this exemplary embodiment by virtue of the fastener module 2 being detached from the attachment assembly 3 by being pulled or tilted at the negative-pressure element 27.

Figure 20A:
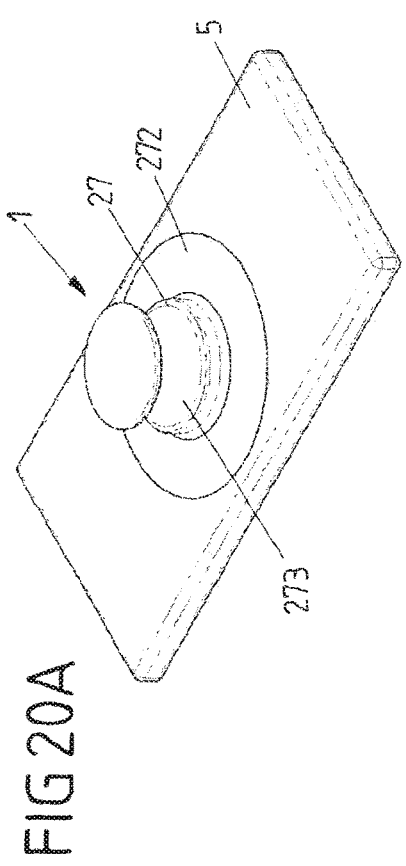
FIG. 20A shows a view of a further exemplary embodiment of a connecting apparatus, before attachment of a fastener module to an attachment component.
Figure 20C:
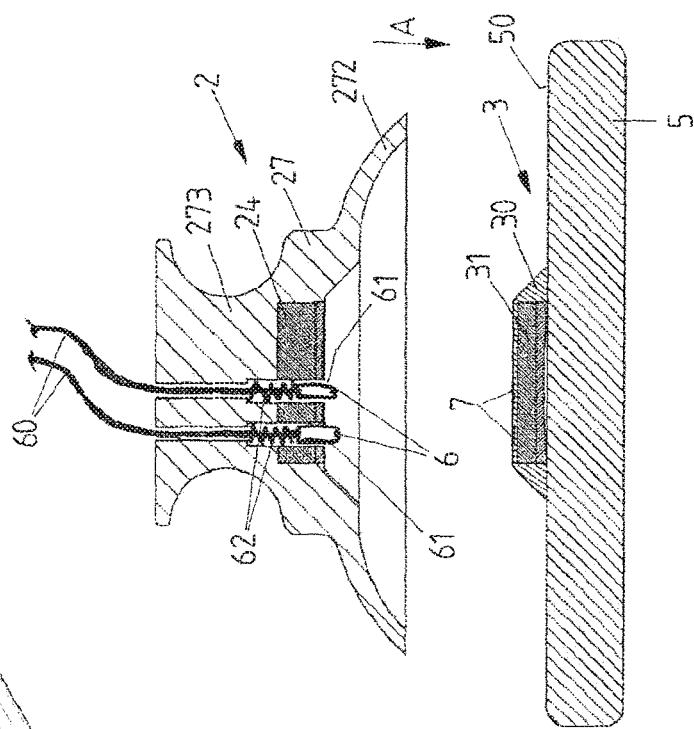
FIG. 20C shows a sectional view along the line B-B as per FIG. 20B.
Figure 20B:
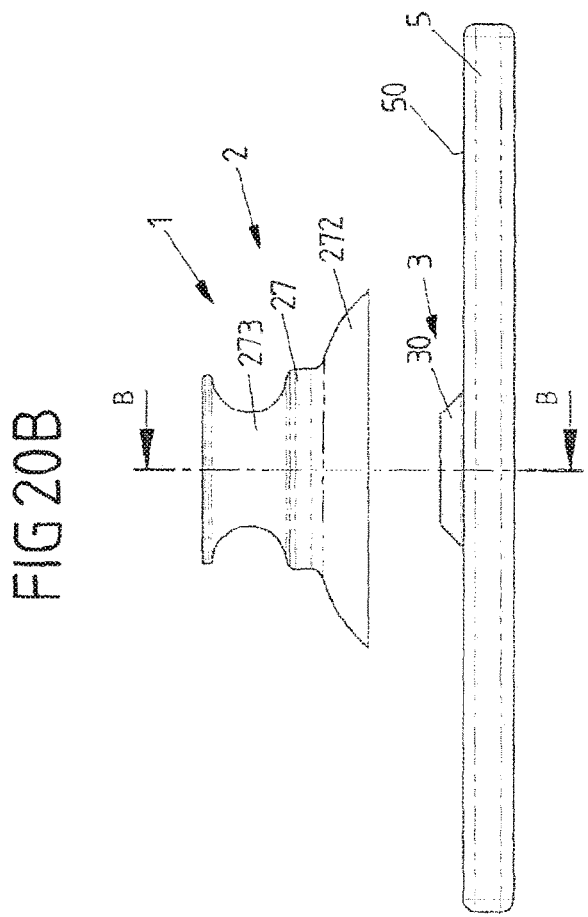
FIG. 20B shows a side view of the arrangement as per FIG. 20A.
Figure 24A:
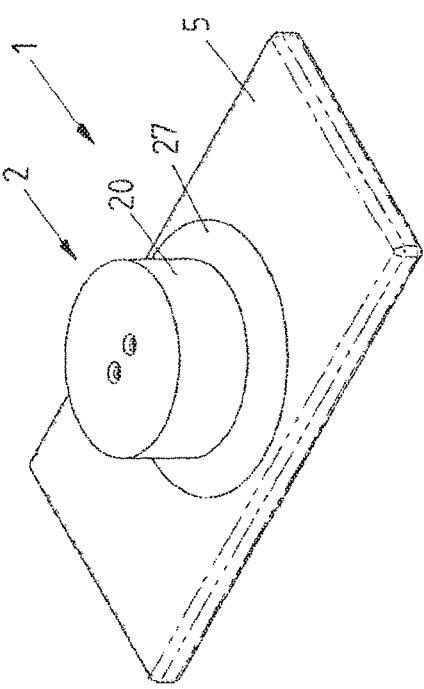
FIG. 24A shows a view of the connecting apparatus, in the case of a fastener module attached to the attachment assembly.
Figure 24C:
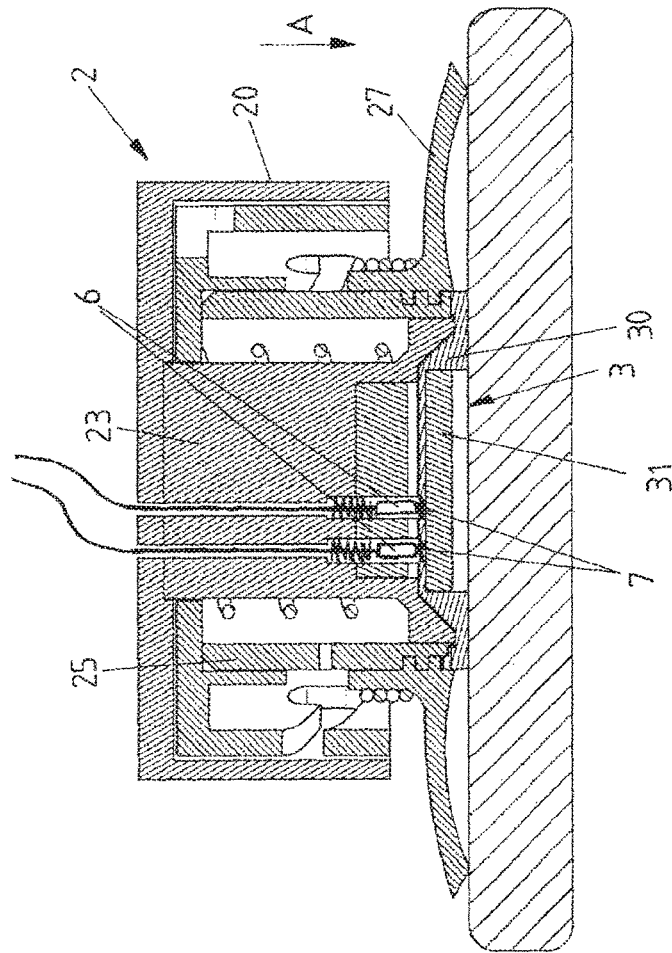
FIG. 24C shows a sectional view along the line E-E as per FIG. 24B.
Figure 24B:
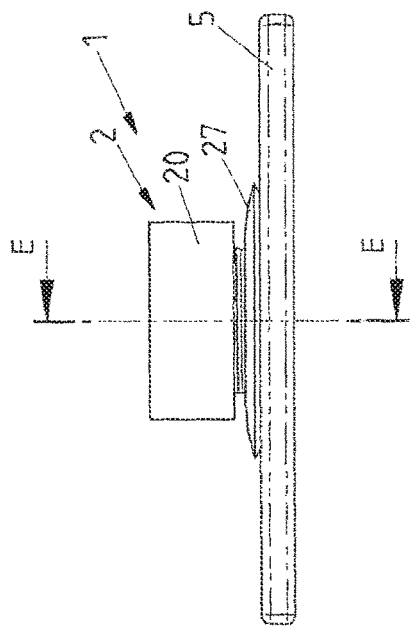
FIG. 24B shows a side view of the arrangement as per FIG. 24A.

In the illustrated exemplary embodiment, electrical contact elements 6 are arranged on the fastener module 2, which contact elements, when the fastener module 2 has been attached to the attachment assembly 3, make electrical contact with associated counterpart contact elements 7 on the attachment assembly 3, as can be seen from FIG. 20C viewed together with FIG. 21C. By means of the contact elements 6 and the counterpart contact elements 7, it is thus possible for an electrical connection to be produced between the assembly 5 associated with the attachment assembly 30 and an assembly associated with the fastener module 2, for example in order to provide an electrical supply or a data connection.

In the illustrated exemplary embodiment, the electrical contact elements 6 have contact pins 61, which, by spring elements 62, are elastically supported on the body 273 of the negative-pressure element 27 and are connected to electrical lines 60. The counterpart contact elements 7 may, by contrast, be formed for example as contact pads or the like on a head side, facing toward the negative-pressure element 27, of the attachment part 30, such that, in a position of the fastener module 2 in which the latter is attached to the attachment assembly 3 (FIGS. 21A-21C), the contact elements 6 make electrical contact with the counterpart contact elements 7.

An exemplary embodiment illustrated in FIGS. 22A-22C to 24A-24C is identical to the exemplary embodiment described on the basis of FIGS. 1A, 1B to 6A-6C, wherein, additionally, electrical contact elements 6 are arranged on the fastener module 2, on the one hand, and on the attachment assembly 3, on the other hand, which contact elements, when the fastener module has been attached to the attachment assembly 3 (FIGS. 24A-24C), make electrical contact with one another and can thus produce an electrical connection between the assemblies associated with the connecting apparatus 1, for example for an electrical supply of an assembly 5, for example of an electronic device in the form of a mobile telephone, or for the purposes of providing a data connection.

Otherwise, with regard to the exemplary embodiment as per FIGS. 22A-22C to 24A-24C, reference is made to that which has been stated with regard to the exemplary embodiment as per FIGS. 1A, 1B to 6A-6C.

The concept underlying the invention is not restricted to the exemplary embodiment discussed above, but rather may basically also be realized in an entirely different way.

In particular, entirely different elements that interact in order to provide negative-pressure forces are conceivable and possible. In this respect, the embodiments discussed above are to be understood merely as examples.

A connecting apparatus of the type described here may serve for the securing of entirely different assemblies to one another. In particular, the connecting apparatus is not restricted in terms of its use to the examples shown here. The connecting apparatus may advantageously be used for securing electronic devices, for example a camera or a mobile telephone. This is however not restrictive.

LIST OF REFERENCE DESIGNATIONS

1 Connecting apparatus
2 Fastener module
20 Casing part
200 Inner lateral face
201 Securing points
202 Guide elements
21 Guide part
210 Lateral face
211 Guide track (slot)
212 Opening
223 Collar
22 Preloading element (spring element)
23 Adjustment element
230 Shank
231 Securing points
232 Top portion
233 Positive-locking portion (positive-locking opening)
234 Receiving opening
235 Closing element
236 Guide piece
24 Magnet element
25 Cylinder part
250 Inner face
251 Flow opening
252 Engagement portion (toothing)
253 Cylindrical cavity
254 Seal
255 Receiving opening
256 Engagement opening
26 Bracing spring
27 Negative-pressure element (cup element)
270 Collar
271 Opening
272 Flexible edge portion
273 Body
274 Flow opening
275 Mounting elements
276 Axle element
277 Guide means
28 Actuation element
280 Spring element
281 Portion
282 Top end
283 Securing points
29 Lid
3 Attachment assembly
30 Attachment part
300 Positive-locking portion
301 Engagement portion (toothing)
302 Receiving opening
303 Thread
304 Surface
31 Magnet element
4 Assembly
5 Assembly
50 Attachment component (attachment face)
500 Opening
501 Thread
51 Container body
6, 7 Electrical contact element
60 Line
61 Contact pin
62 Spring element
A Attachment direction
B Space
D Direction of rotation
F Air flow
O Opening direction
R Axis of rotation

The invention claimed is:

1. An assembly group, comprising:
an electronic device, and
a connecting apparatus for detachably connecting the electronic device to a further assembly, wherein the connecting apparatus comprises a fastener module having a negative-pressure element connectable in an attachment direction to an attachment component for connecting the electronic device to the further assembly, wherein the negative-pressure element, in a connected position, interacts with the attachment component such that, in the event of a load acting in between the fastener module and the attachment component opposite to the attachment direction, the negative-pressure element and the attachment component are held against one another by a negative pressure acting between the negative-pressure element and the attachment component,
wherein the fastener module comprises a first magnet element for magnetically assisting the connection of the electronic device to the further assembly,
wherein the negative-pressure element is formed by a cup element, said cup element comprising a body and a flexible edge portion radially protruding from and circumferentially extending about the body, said flexible edge portion being configured to be elastically deformed for causing said negative pressure,
wherein the connecting apparatus further comprises an attachment assembly, the attachment assembly being securable to the attachment component and comprising an attachment part, the fastener module being configured to be operatively connected to the attachment part, said fastener module comprising a first positive-locking portion and the attachment part comprising a second positive-locking portion, and;
wherein the first positive-locking portion and the second positive-locking portion are configured, during attachment of the fastener module and the attachment part to one another, to engage with one another in order to counteract a transverse movement between the fastener module and the attachment component.

2. The assembly group as claimed in claim 1, wherein the first magnet element is arranged on the negative-pressure element.

3. The assembly group as claimed in claim 1, further comprising a second magnet element, which is securable to the attachment component, for magnetic interaction with the first magnet element of the fastener module.

4. The assembly group as claimed in claim 1, wherein the fastener module comprises at least one electrical contact element for electrical contacting, in the connected position, with at least one counterpart contact element associated with the attachment component.

* * * * *